US012812706B2

(12) United States Patent
Khan et al.

(10) Patent No.: US 12,812,706 B2
(45) Date of Patent: Nov. 24, 2026

(54) ELECTRONIC DEVICE FOR PERFORMING DIRECT COMMUNICATION AND STORAGE MEDIUM THEREFOR

(71) Applicant: SAMSUNG ELECTRONICS CO., LTD., Suwon-si (KR)

(72) Inventors: Md. Mahmud Muntakim Khan, Dacca (BD); Md. Mahbubul Haque, Dacca (BD); Md Abdul Quaum, Dacca (BD); Muhammad Mushfiqul Islam, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 372 days.

(21) Appl. No.: 18/416,566

(22) Filed: Jan. 18, 2024

(65) Prior Publication Data

US 2025/0081260 A1 Mar. 6, 2025

(30) Foreign Application Priority Data

Sep. 6, 2023 (KR) ........................ 10-2023-0118359

(51) Int. Cl.
*H04W 76/14* (2018.01)
*H04W 72/02* (2009.01)
(Continued)

(52) U.S. Cl.
CPC ........... *H04W 76/14* (2018.02); *H04W 72/02* (2013.01); *H04W 72/0453* (2013.01); *H04W 72/51* (2023.01); *H04W 84/12* (2013.01)

(58) Field of Classification Search
CPC ..... H04W 76/14; H04W 72/51; H04W 72/02; H04W 72/0453
See application file for complete search history.

(56) References Cited

U.S. PATENT DOCUMENTS 9,043,395 B2 5/2015 Thangadorai
9,521,589 B2 12/2016 Lee et al.
(Continued)

FOREIGN PATENT DOCUMENTS

CN 114928898 A * 8/2022 .............. H04W 4/80
CN 116033443 A * 4/2023
EP 3833151 A1 * 6/2021 ............ H04W 88/06

OTHER PUBLICATIONS

"Samsung Shares Vision To Bring Calm to the Connected Device Experience at CES® 2023", Samsung Newsroom, Jan. 5, 2023, 15 total pages, https://news.samsung.com/global/samsungshares-vision-to-bring-calm-to-theconnected-device-experience-at-ces-2023.

*Primary Examiner* — Erika A Washington
(74) *Attorney, Agent, or Firm* — Sughrue Mion, PLLC

(57) ABSTRACT

An electronic device includes: memory storing instructions, a communication circuit comprising a Bluetooth communication module and a Wi-Fi module, and a processor operatively connected with the memory and the communication circuit. and the instructions are configured to, when executed by the processor, cause the electronic device to: broadcast first capability information of the electronic device associated with a Wi-Fi direct connection, receive second capability information of an external electronic device associated with the Wi-Fi direct connection, select a group owner and a frequency band for the Wi-Fi direct connection, based on the first capability information and the second capability information, transmit group owner information indicating the selected group owner and the selected frequency band to the external electronic device, and establish a peer-to-peer (P2P) connection with the external electronic device by using the selected frequency band.

20 Claims, 30 Drawing Sheets

(51) Int. Cl.

| | |
|---|---|
| ***H04W 72/0453*** | (2023.01) |
| ***H04W 72/51*** | (2023.01) |
| *H04W 84/12* | (2009.01) |

(56) References Cited

U.S. PATENT DOCUMENTS

| | | | | |
|---|---|---|---|---|
| 9,681,365 | B2 | 6/2017 | Gupta et al. | |
| 2012/0278389 | A1 | 11/2012 | Thangadorai | |
| 2014/0201280 | A1 | 7/2014 | Qi et al. | |
| 2015/0215939 | A1 | 7/2015 | Kikkawa et al. | |
| 2016/0057215 | A1* | 2/2016 | Rayanki | H04L 67/1048 709/228 |
| 2018/0109609 | A1 | 4/2018 | Parks | |
| 2019/0319868 | A1* | 10/2019 | Svennebring | H04W 24/08 |
| 2021/0051659 | A1 | 2/2021 | Kim et al. | |
| 2023/0132460 | A1* | 5/2023 | Hareuveni | H04W 72/40 370/329 |
| 2024/0098816 | A1* | 3/2024 | Yan | H04W 76/14 |

* cited by examiner 2022a or 2024a: Platform information

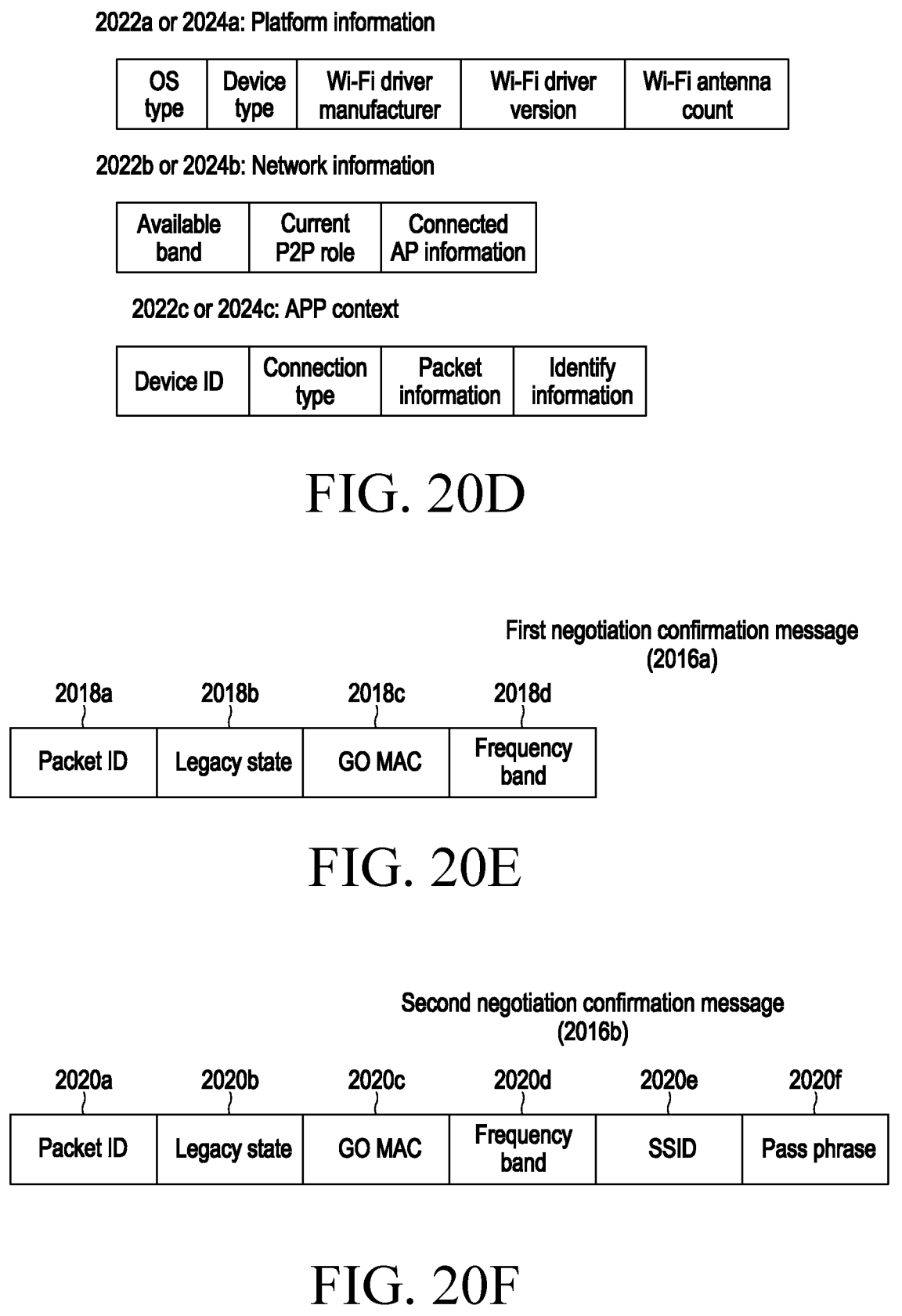

| OS type | Device type | Wi-Fi driver manufacturer | Wi-Fi driver version | Wi-Fi antenna count |
|---|---|---|---|---|

2022b or 2024b: Network information

| Available band | Current P2P role | Connected AP information |
|---|---|---|

2022c or 2024c: APP context

| Device ID | Connection type | Packet information | Identify information |
|---|---|---|---|

FIG. 20D

First negotiation confirmation message (2016a)

| 2018a | 2018b | 2018c | 2018d |
|---|---|---|---|
| Packet ID | Legacy state | GO MAC | Frequency band |

FIG. 20E

Second negotiation confirmation message (2016b)

| 2020a | 2020b | 2020c | 2020d | 2020e | 2020f |
|---|---|---|---|---|---|
| Packet ID | Legacy state | GO MAC | Frequency band | SSID | Pass phrase |

FIG. 20F

ELECTRONIC DEVICE FOR PERFORMING DIRECT COMMUNICATION AND STORAGE MEDIUM THEREFOR

CROSS-REFERENCE TO RELATED APPLICATION(S)

This application is based on and claims priority under 35 U.S.C. § 119 to Korean Patent Application No. 10-2023-0118359, filed on Sep. 6, 2023, in the Korean Intellectual Property Office, the disclosure of which is herein incorporated by reference in its entirety.

BACKGROUND

1. Field

The disclosure relates to an electronic device for performing direct communication and an operation method thereof.

2. Description of the Related Art

Wi-Fi Direct technology may provide direct communication to Wi-Fi supporting devices through a peer-to-peer (P2P) protocol connection (e.g., P2P communication) without the need for a network infrastructure device (e.g., an access point or a router).

Wi-Fi Direct technology enables mobile devices (e.g., smartphones, cell phones, personal digital assistants (PDAs), tablet personal computers (PCs), laptop PCs, electronic notebooks, electronic dictionaries, MP3 players, etc.) as well as display devices (e.g., including TVs) to transfer or share content (e.g., text, images, videos, games, or documents) with each other.

A P2P channel used for the Wi-Fi direct connection may be determined at the time of generating a P2P group. For example, in a case of establishing a Wi-Fi direct connection between a display device and a mobile device, a device (e.g., a display device) that is to perform the role of a group owner (GO) may select the P2P channel.

SUMMARY

Provided are an electronic device and a storage medium that use Bluetooth low energy (BLE) to perform P2P group formation through Wi-Fi.

Provided are an electronic device and a storage medium that use BLE to configure a P2P group for Wi-Fi direct communication.

Provided are an electronic device and a storage medium that use Bluetooth technology in P2P communication to perform group owner negotiation or frequency selection for Wi-Fi direct communication.

According to an aspect of the disclosure, an electronic device includes memory storing instructions; a communication circuit comprising a Bluetooth communication module and a Wi-Fi module; and a processor operatively connected with the memory and the communication circuit. The instructions are configured to, when executed by the processor, cause the electronic device to: broadcast, through the Bluetooth communication module, first capability information of the electronic device associated with a Wi-Fi direct connection; receive, through the Bluetooth communication module, second capability information of an external electronic device associated with the Wi-Fi direct connection; select a group owner and a frequency band for the Wi-Fi direct connection, based on the first capability information and the second capability information; transmit group owner information indicating the selected group owner and the selected frequency band to the external electronic device through the Bluetooth communication module; and establish a peer-to-peer (P2P) connection with the external electronic device through the Wi-Fi module by using the selected frequency band.

According to an aspect of the disclosure, a non-transitory computer-readable storage medium storing one or more programs, the one or more programs comprising instructions configured to, when executed by a processor of an electronic device, cause the electronic device to: broadcast, through a Bluetooth communication module, first capability information of the electronic device associated with a Wi-Fi direct connection; receive, through the Bluetooth communication module, second capability information of an external electronic device associated with the Wi-Fi direct connection; select a group owner and a frequency band for the Wi-Fi direct connection, based on the first capability information and the second capability information; transmit group owner information indicating the selected group owner and the selected frequency band to the external electronic device through the Bluetooth communication module; and establish a peer-to-peer (P2P) connection with the external electronic device by using the selected frequency band.

BRIEF DESCRIPTION OF THE DRAWINGS

The above and other aspects, features, and advantages of the disclosure will be more apparent from the following detailed description taken in conjunction with the accompanying drawings, in which:

FIG. 20D illustrates packet formats for group owner negotiations according to embodiments of the disclosure;

FIG. 20E illustrates packet formats for group owner negotiations according to embodiments of the disclosure;

FIG. 20F illustrates packet formats for group owner negotiations according to embodiments of the disclosure;

DETAILED DESCRIPTION

Figure 1:
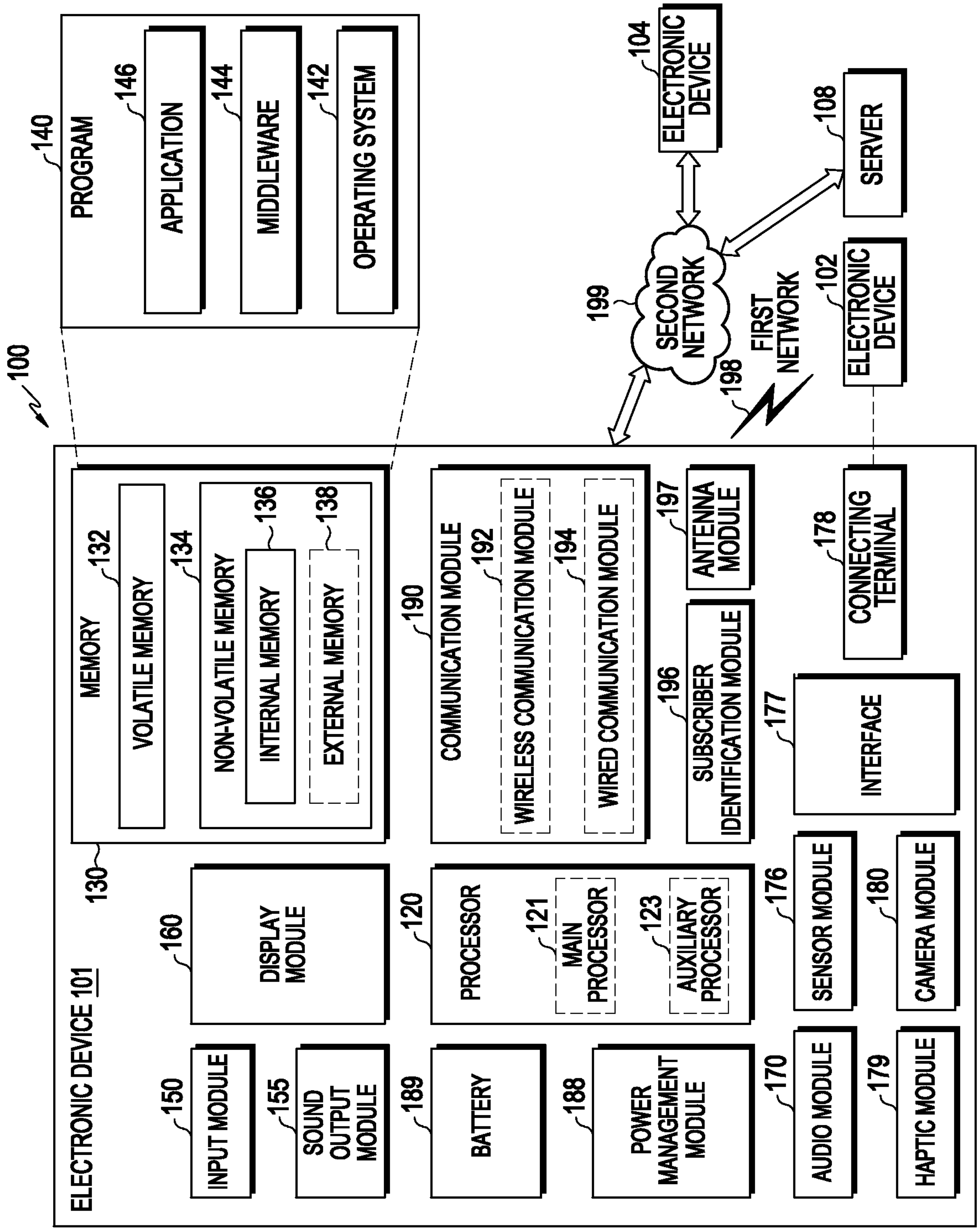
FIG. 1 illustrates an electronic device in a network environment according to various embodiments.

FIG. 1 is a block diagram illustrating an electronic device 101 in a network environment 100 according to embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
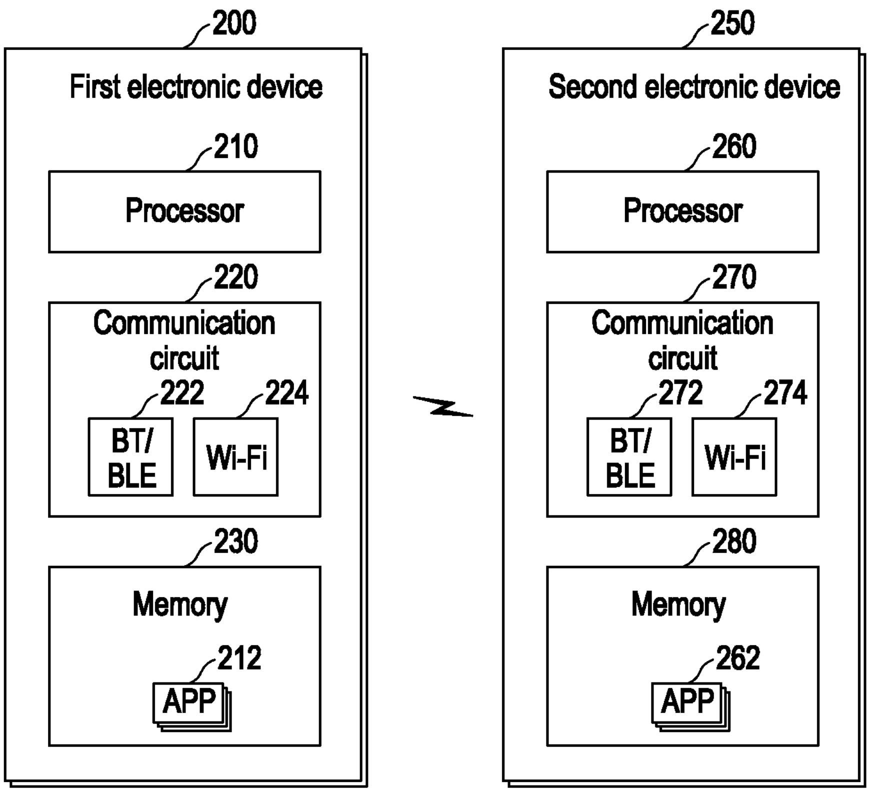
FIG. 2 illustrates a system configuration for a communication connection according to an embodiment of the disclosure.

FIG. 2 is a block diagram showing a system configuration for a communication connection according to an embodiment of the disclosure.

Referring to FIG. 2, a first electronic device 200 (e.g., the electronic device 101) may communicate with a second electronic device 250 (e.g., the electronic device 101) by using a wireless communication technology or a wired communication technology. In an embodiment, the first electronic device 200 (e.g., the electronic device 101) and the second electronic device 250 (e.g., the electronic device 101) may be configured to support at least one of peer-to-peer (P2P) communication based on Wi-Fi direct, Bluetooth legacy (BT), Bluetooth Low Energy (BLE), a network interface, an autonomous group owner of a P2P connection, multi device experience (MDE), a networking protocol, or a wireless communication.

The first electronic device 200 (e.g., the electronic device 101 of FIG. 1) may include a processor 210 (e.g., the processor 120 of FIG. 1), a communication circuit 220 (e.g., the wireless communication module 194 of FIG. 1), and memory 230 (e.g., memory 130 of FIG. 1).

In an embodiment, the communication circuit 220 of the first electronic device 200 may include a communication module (e.g., a BT/BLE module 222) for supporting Bluetooth legacy and/or BLE and/or a communication module (e.g., a Wi-Fi module 224) for supporting Wi-Fi. The BT/BLE module 222 or the Wi-Fi module 224 may include one or more communication components that transmit or receive signals to or from an external electronic device (e.g., the second electronic device 250) by using one or more antennas. In an embodiment, the one or more antennas may be implemented as part of the antenna module 198 of FIG. 1. According to an embodiment, the communication circuit 220 may use the BT/BLE module 222 and/or the Wi-Fi module 224 to support communications based on BT and/or BLE (hereinafter referred to as BT/BLE) schemes and/or Wi-Fi schemes.

The first electronic device 200 may include a processor 210 (e.g., the processor 120 of FIG. 1), which may be implemented as one or more single-core processors or one or more multi-core processors, and memory 230 (e.g., memory 130 of FIG. 1) for storing instructions for operation of the first electronic device 200.

According to embodiments of the disclosure, the memory 230 may store instructions or related data for negotiating group owners (GOs) and frequency bands for Wi-Fi direct-based P2P communication by using BT/BLE. According to embodiments of the disclosure, the processor 210 may execute at least one application (e.g., an application program (APP) 212) based on Wi-Fi direct communication, and may control the communication circuit 220 (e.g., the BT/BLE module 222 and/or the Wi-Fi module 224) based on execution of the APP 212. In one embodiment, the App 212 may be included in the memory 230.

The second electronic device 250 (e.g., the electronic device 101 of FIG. 1) may include a processor 260 (e.g., the processor 120 of FIG. 1), a communication circuit 270 (e.g., the wireless communication module 194 of FIG. 1), and/or memory 280 (e.g., memory 130 of FIG. 1).

In an embodiment, the communication circuit 270 of the second electronic device 250 may include a communication module (e.g., a BT/BLE module 272) for supporting Bluetooth legacy and/or BLE, and/or a communication module (e.g., Wi-Fi module 274) for supporting Wi-Fi. The BT/BLE module 272 and/or the Wi-Fi module 274 may include one or more communication components that transmit or receive signals to or from an external electronic device (e.g., the first electronic device 200) by using one or more antennas. In an embodiment, the one or more antennas may be implemented as part of the antenna module 198 of FIG. 1. According to an embodiment, the communication circuit 270 may use the BT/BLE module 272 and/or the Wi-Fi module 274 to support communications based on BT and/or BLE (hereinafter referred to as BT/BLE) schemes and/or Wi-Fi schemes.

The second electronic device 250 may include a processor 260 (e.g., the processor 120 of FIG. 1), which may be implemented as one or more single-core processors or one or more multi-core processors, and memory 280 (e.g., memory 130 of FIG. 1) for storing instructions for operation of the second electronic device 250.

According to embodiments of the disclosure, the memory 280 may store instructions or related data for negotiating group owners (GOs) and frequency bands for Wi-Fi direct-based PSP communications by using BT/BLE. According to embodiments of the disclosure, processor 260 may execute at least one application (e.g., an application (APP) 262) based on Wi-Fi direct communications, and may control the communication circuit 270 (e.g., the BT/BLE module 272 and/or the Wi-Fi module 274) based on execution of the APP 262. In one embodiment, the App 262 may be included in the memory 280.

P2P communication using Wi-Fi Direct has become popular and widely used in multi-device environments due to its high bandwidth, low latency, and minimal packet loss. The first electronic device 200 and the second electronic device 250 may communicate directly with each other using Wi-Fi Direct without the need for a centralized access point (AP). In an embodiment, at least one of the first electronic device 200 or the second electronic device 250 may include at least one of a cell phone, camera, printer, personal computer (PC), or gaming device, and may use Wi-Fi Direct to generate its own Wi-Fi network without an Internet connection.

The first electronic device 200 and the second electronic device 250 may be connected to each other via a P2P group including one or more external electronic devices that are connected one-to-one or simultaneously, so as to quickly and easily transmit, display, play, or share contents.

As the demand for a device-to-device communication increases, the first electronic device 200 and the second electronic device 250 may provide reliable and stable P2P connection to allow users to have a satisfying experience with the device-to-device communication.

The first electronic device 200 and the second electronic device 250 may use a Wi-Fi P2P channel for services that use the device-to-device communication. In an embodiment, services that use the device-to-device communication may include at least one of file sharing, screen mirroring, second screen, multi-control to share peripherals (e.g., a keyboard and/or a mouse) between devices, an auto switch, or continuity services to support simultaneous connectivity between devices. These services may be based on the device-to-device communication using P2P connections.

Figure 3A:
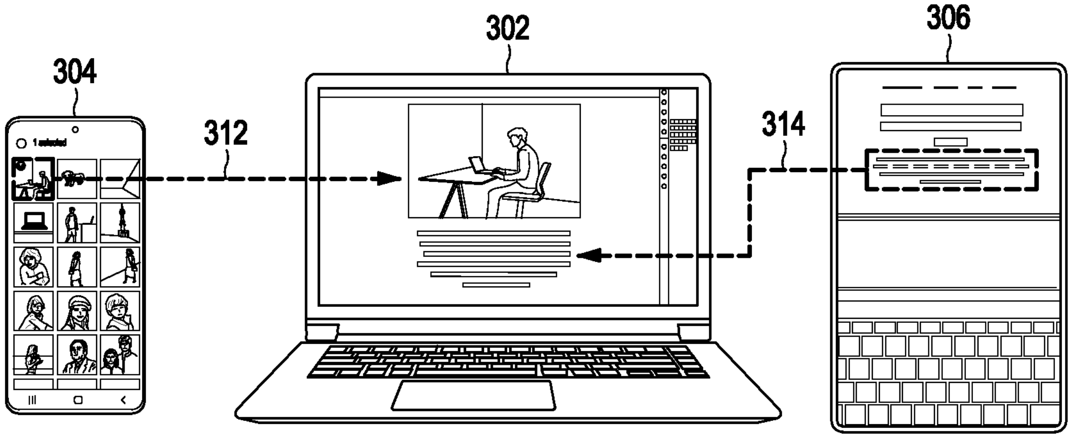
FIG. 3A illustrates multi-control operations based on a Wi-Fi direct connection according to an embodiment of the disclosure.
Figure 3B:
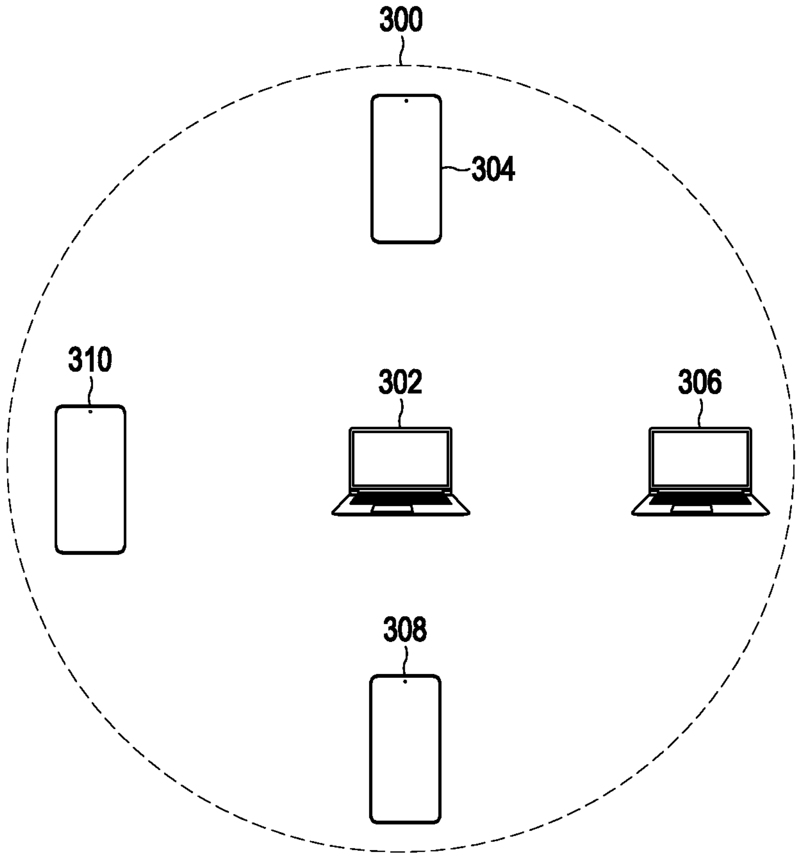
FIG. 3B illustrates multi-control operations based on a Wi-Fi direct connection according to an embodiment of the disclosure.

FIG. 3A illustrates multi-control based on a Wi-Fi direct connection according to an embodiment of the disclosure. FIG. 3B illustrates multi-control based on a Wi-Fi direct connection according to an embodiment of the disclosure.

Referring to FIG. 3A, an electronic device 302 (e.g., the first electronic device 200) may configure a P2P network topology (1:N) to provide uninterrupted connectivity with nearby electronic devices 304 and 306. The contiguity of the electronic devices 302, 304, and 306 allows a user to control the electronic devices 302, 304, and 306 by using a single mouse, a keyboard, or a touch pad. For example, the user may drag an image (e.g., an image 312) being displayed on the electronic device 304 (e.g., a mobile phone) and drop the image on a display screen of the electronic device 302 (e.g., a laptop PC), or may drag text (e.g., an image 314) being displayed on the electronic device 306 (e.g., a tablet PC) and drop the text on a display screen of the electronic device 302 (e.g., a PC).

Referring to FIG. 3B, a Wi-Fi direct connection (e.g., a P2P group 300 including a 1:N network) among the electronic devices 302, 304, 306, 308, and 310 may be configured to enable a user to use multi-control based on continuity among the electronic devices (e.g., the electronic devices 302, 304, 306, 308, and 310). One electronic device (e.g., the electronic device 302) among the electronic devices 302, 304, 306, 308, and 310 may serve as a group owner (GO) of a P2P group 300, and other electronic devices (e.g., the electronic devices 304, 306, 308, and 310) may be connected to the electronic device 302, as group clients (GCs), respectively.

The electronic device 302 may be dynamically selected as a GO based on capability information (e.g., device capability information) of N electronic devices (e.g., the electronic devices 302, 304, 306, 308, and 310) participating in the P2P group 300. The electronic device 302, which is selected as a GO, may select an appropriate frequency band to allow GC devices (e.g., the electronic devices 304, 306, 308, and 310) to be connected to the electronic device 302 while maintaining high throughput for data transmission.

Figure 4A:
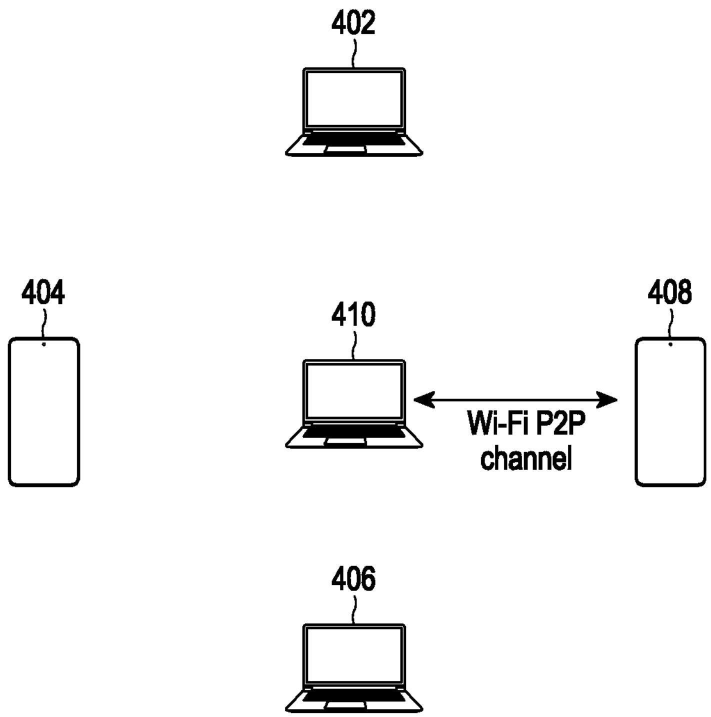
FIG. 4A illustrates an example of group formation for multi-control services according to an embodiment of the disclosure.
Figure 4B:
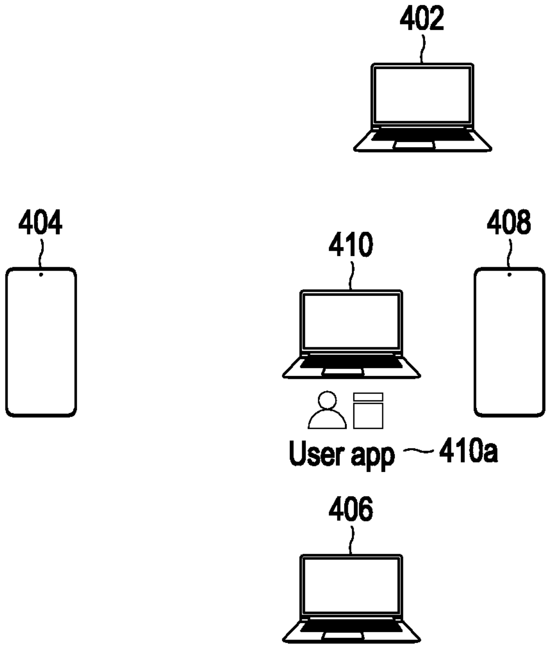
FIG. 4B illustrates an example of group formation for multi-control services according to an embodiment of the disclosure.

FIGS. 4A and 4B illustrate examples of group formation for multi-control services according to an embodiment of the disclosure. Here, FIG. 4A illustrates a standard group formation based on group owner (GO) negotiation between devices, and FIG. 4B illustrates an autonomous group formation based on an application or user intervention.

Referring to FIG. 4A, among electronic devices (e.g., electronic devices 402, 404, 406, 408, and 410) participating in multi-control service, two electronic devices (e.g., the electronic device 410 and the electronic device 408) may perform a group owner negotiation and a selection based on a Wi-Fi Direct protocol. The electronic device 410 (e.g., the first electronic device 200) and the electronic device 408 (e.g., the second electronic device 250) may perform a group owner negotiation with each other, for example, through a Wi-Fi P2P channel at a designated timepoint.

Referring to FIG. 4B, in the case of the autonomous group formation, one electronic device (e.g., the electronic device 410) among the electronic devices (e.g., the electronic devices 402, 404, 406, 408, and 410) participating in the multi-control service may configure a P2P group including the electronic devices 402, 404, 406, 408, and 410, automatically by an application 410*a* or based on a user input via the application 410*a*.

Figure 5:
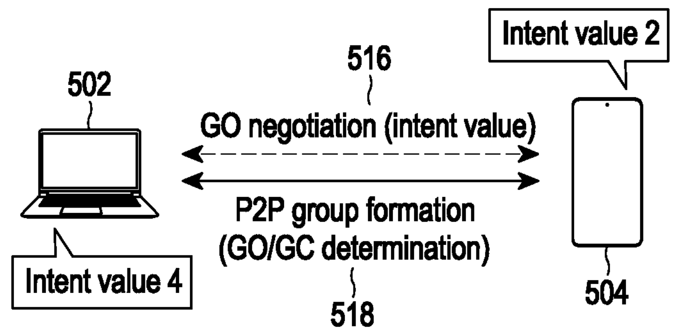
FIG. 5 illustrates inter-device negotiation operations in standard group formation according to an embodiment of the disclosure.

FIG. 5 illustrates device-to-device negotiation in the standard group formation according to an embodiment of the disclosure.

Referring to FIG. 5, electronic devices (e.g., an electronic device 502 and an electronic device 504) that desire to participate in a multi-control service may perform group owner negotiation/selection according to a Wi-Fi P2P protocol.

At time T1, the electronic device 502 (e.g., the first electronic device 200) (e.g., laptop PC) and the electronic device 504 (e.g., a mobile phone) may initiate group owner negotiations for the standard group formation. For group owner negotiation, the electronic device 502 and the electronic device 504 may express an intent to serve as a group owner through a designated numeric value (e.g., an intent value). For example, the electronic device 502 may configure its intent value (e.g., a first intent value) to be four (4) and the electronic device 504 may configure its intent value (e.g., a second intent value) to be two (2). In operation 516, the electronic device 502 may transmit negotiation request packets including the first intent value of four (4) to external electronic devices (e.g., the electronic device 504), and may receive negotiation response packets including the second intent value of two (2) from the electronic device 504.

In operation 518, the electronic device 502 may confirm that the first intent value is greater than the second intent value upon receiving the negotiation response packet. Therefore, the electronic device 502 may determine to be a group owner, and the electronic device 504 may determine to be a group client. During operation 518, the electronic device 502 and the electronic device 504 may establish a P2P connection to organize a P2P group based on the group owner role and the group client role. For example, a group owner negotiation procedure including operation 516 and operation 518 may take 2 to 4 seconds.

Once the P2P group is organized, other electronic devices may participate in the P2P group as in a traditional Wi-Fi network: the electronic device (e.g., the electronic device 502) serving as the group owner may periodically transmit a beacon signal.

Figure 6:
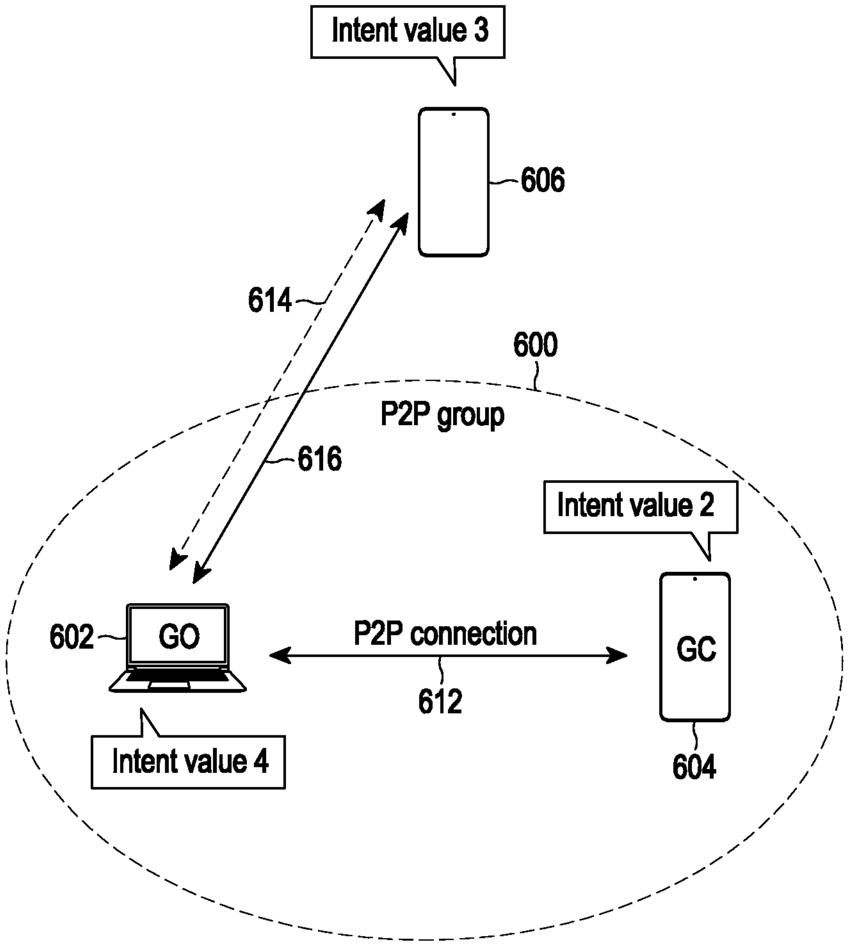
FIG. 6 illustrates operations of adding members in standard group formation according to an embodiment of the disclosure.

FIG. 6 illustrates an operation of adding members in standard group formation according to an embodiment of the disclosure.

Referring to FIG. 6, a P2P group 600 organized according to the standard group formation may include an electronic device 602 (e.g., the first electronic device 200) (e.g., a laptop PC) and an electronic device 604 (e.g., a mobile phone). In operation 612, the electronic device 602, as a GO, having a first intent value (e.g., four (4)) may be connected to the electronic device 604 having a second intent value (e.g., two (2)) via a P2P connection.

After the P2P group 600 is organized at time T1, an electronic device 606 (e.g., a mobile phone) may attempt to connect to the P2P group 600 at time T2. The electronic device 606 may have a third intent value of 3, for example.

In operation 614, the electronic device 602 and the electronic device 606 may exchange the first intent value of four (4) and the third intent value of three (3), and perform group ownership negotiations based on the exchanged intent values. For example, the electronic device 602 has a first intent value of four (4) and already exist as a GO, and may transmit a negotiation request packet including the first intent value of four (4) to other devices (e.g., the electronic device 606), and the electronic device 606 may transmit a negotiation response packet including the third intent value of three (3) to the electronic device 602.

In operation 616, upon receiving the negotiation response packet, the electronic device 602 may confirm that the first intent value of the electronic device 602 is greater than the third intent value of the electronic device 606. Since electronic device 606 has the third intent value that is smaller than the first intent value of the electronic device 602, the electronic device 606 may be determined to perform a role of GC and may be connected to the electronic device 602, which is the GO of P2P group 600.

Figure 7:
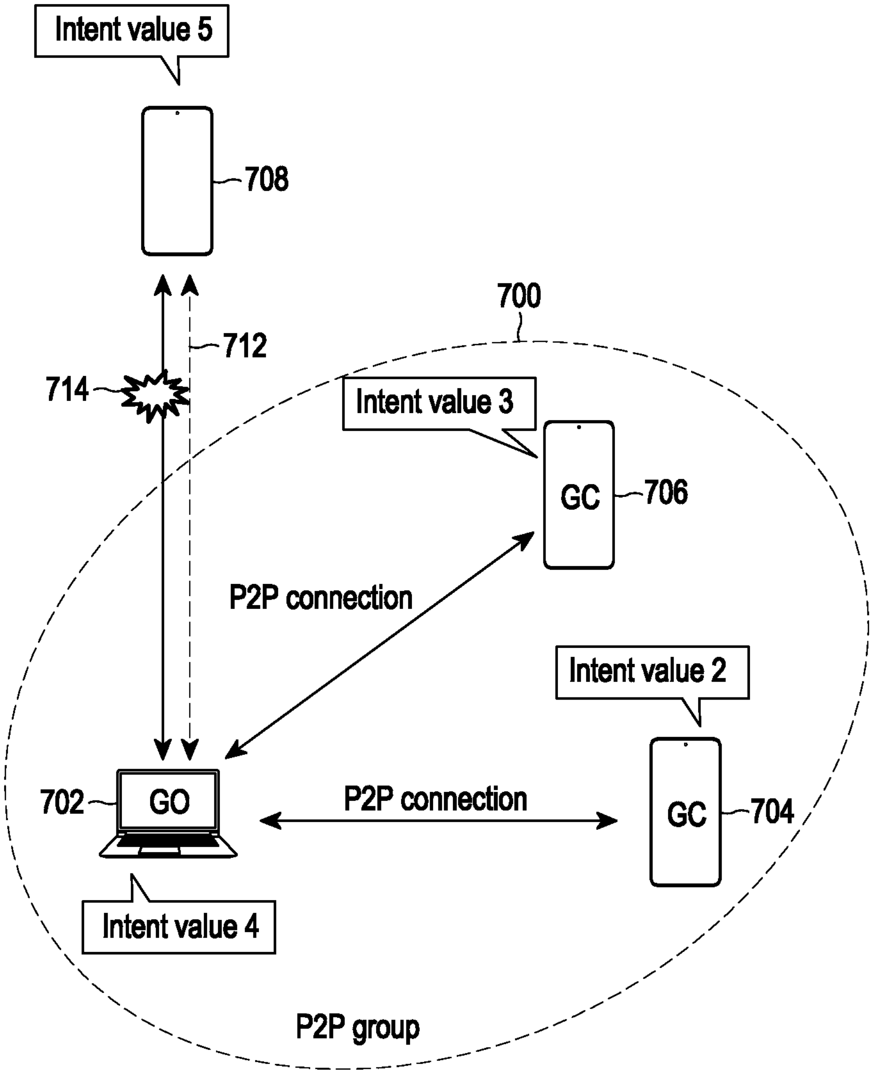
FIG. 7 illustrates a case of failing operations to add members in standard group formation.

FIG. 7 illustrates a case of failing to add members.

Referring to FIG. 7, a P2P group 700 organized according to the standard group formation may include an electronic device 702 (e.g., the first electronic device 200) (e.g., a laptop PC), an electronic device 704 (e.g., a mobile phone), and an electronic device 706. The electronic device 702 having a first intent value (e.g., four (4)) may be connected, as a GO, to the electronic device 704 having a second intent value (e.g., two (2)) and the electronic device 706 having a third intent value (e.g., three (3)) through their respective P2P connections.

After the P2P group 600 is organized at times T1 and T2, an electronic device 708 (e.g., a mobile phone) may attempt to connect to the P2P group 700 at time T3. For example, the electronic device 708 may have a fourth intent value of five (5), for example.

In operation 712, the electronic device 702, which is GO, may transmit a negotiation request packet including the first intent value of four (4), and may receive a negotiation response packet from the electronic device 708 including the fourth intent value of five (5).

In operation 714, upon receiving the negotiation response packet, the electronic device 702, which is GO, may confirm that the fourth intent value of the electronic device 708 is greater than the first intent value of the electronic device 702. Accordingly, the electronic device 708 may not be connected to the electronic device 702, which is the GO of the P2P group 700.

In the example shown, the electronic device 708 may require certain time (for example, 2 to 4 seconds) to confirm that the electronic device 708 is unable to be connected to the electronic device 702.

In an embodiment, as the electronic device 708 attempts to connect to the P2P group 700 by using a fourth intent value that is greater than the first intent value, the following operations may be performed.

The electronic device 702 may determine that it is unable to establish a P2P connection with the electronic device 708 based on the negotiation in operation 712 and the confirmation of the intent value in operation 714. The electronic device 702 may release the P2P connections with the electronic device 704 and the electronic device 706 so that the electronic device 702 may configure a new P2P group including the electronic device 708. After releasing the P2P connections with the electronic device 704 and the electronic device 706, the electronic device 702 may change the first intent value to a value (e.g., seven (7)) higher than the fourth intent value of the electronic device 708 and re-establish the group owner and P2P connections with the electronic devices 704, 706, and 708, respectively.

Figure 8:
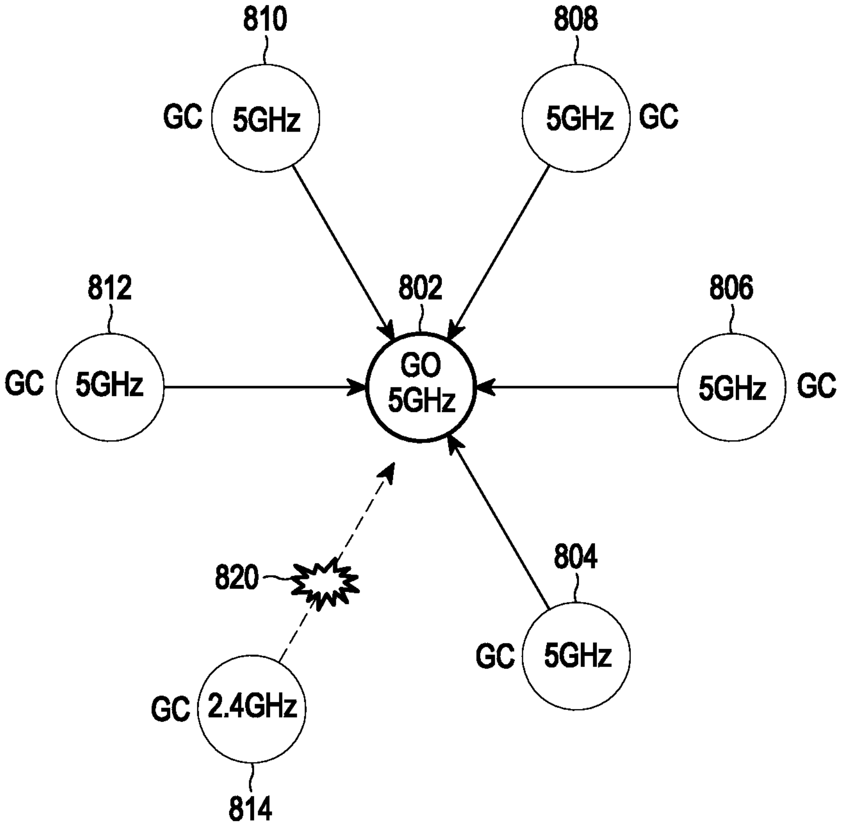
FIG. 8 illustrates an autonomous group formation according to an embodiment of the disclosure.

FIG. 8 illustrates an autonomous group formation according to an embodiment of the disclosure.

Referring to FIG. 8, in a case of the autonomous group formation, one electronic device (e.g., an electronic device 802) among electronic devices (e.g., electronic devices 802, 804, 806, 808, 810, 812, and 814) that desire to participate in multi-control services may select a group owner based on an application or a user input. For example, the electronic device 802 (e.g., the first electronic device 200) may be selected as a GO of a P2P group that includes the electronic devices 802, 804, 806, 808, 810, 812, and 814, based on the application or the user input. The electronic device 802, which is selected as the GO, may select a frequency band to be used in the P2P group, and then, initiate group owner operation.

The electronic device 802 may select the group owner and a frequency band through an application or a user intervention without considering the capability information of all electronic devices (e.g., the electronic devices 802, 804, 806, 808, 810, 812, and 814) that participate in the P2P group. For example, the electronic devices 802, 804, 806, 808, 810, and 812 may support the 5 GHz frequency band, but the electronic device 814 may only support the 2.4 GHz frequency band. The electronic device 802 may select the 5 GHz frequency band after being determined to be a GO through an application or a user intervention, without knowing capability information (e.g., available frequency band) of the electronic device 814, and as a result, as shown in operation 820 of FIG. 8, the electronic device 814 may not be able to connect to the electronic device 802, which is a manually selected GO.

Figure 9:
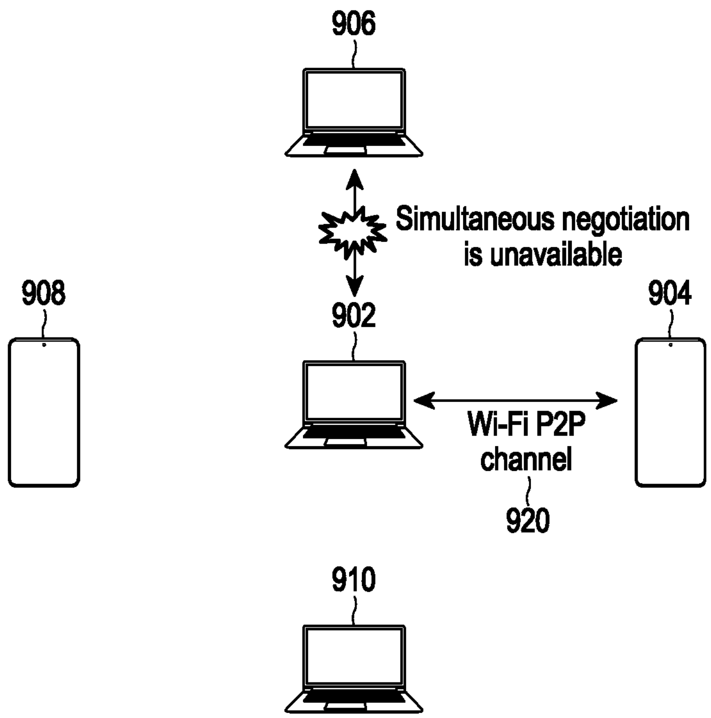
FIG. 9 illustrates a group owner negotiation for multi-control services according to an embodiment of the disclosure.

FIG. 9 illustrates a group owner negotiation for multi-control services according to an embodiment of the disclosure.

Referring to FIG. 9, an electronic device 902 (e.g., the first electronic device 200) may perform group owner negotiations for a standard group formation according to Wi-Fi P2P protocol with one electronic device (e.g., an electronic device 904) among a plurality of electronic devices (e.g., electronic devices 904, 906, 908, and 910) that desire to participate in multi-control services. For multi-control services, the electronic device 902 may need to consider the capability information of the other electronic devices 904, 906, 908, and 910 at the time of performing group owner negotiations with the electronic device 904.

In a case that group owner negotiations are performed between the electronic device 902 and the electronic device 904 without simultaneously considering the capabilities of the plurality of the electronic devices 904, 906, 908, and 910, an incorrect group owner selection or incorrect frequency selection may result in or cause some electronic devices (e.g., the electronic device 906) not being able to participate in multi-control services.

Figure 10:
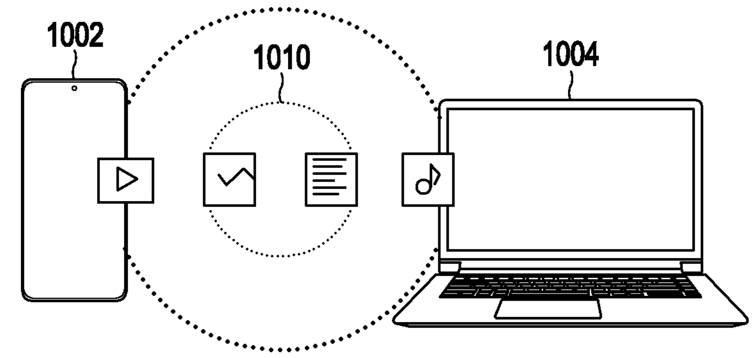
FIG. 10 illustrates file sharing operations according to an embodiment of the disclosure.

FIG. 10 illustrates file sharing operations according to an embodiment of the disclosure.

Referring to FIG. 10, an electronic device 1002 (e.g., the first electronic device 200) may use Bluetooth technology (e.g., BLE) to discover a nearby electronic device (e.g., an electronic device 1004) that desires to share a file via a file sharing service. The electronic device 1002 may establish a Wi-Fi Direct-based P2P connection with the discovered electronic device 1004 (e.g., the second electronic device 250), and may share files 1010 (e.g., music, images, documents, and/or videos) with the electronic device 1004 via the P2P connection.

The electronic device 1002 and the electronic device 1004 may perform group owner negotiation to establish a Wi-Fi Direct-based P2P connection. During group owner negotiation using a Wi-Fi P2P channel, a negotiation failure due to packet loss may occur, and this may cause file sharing to fail.

Figure 11:
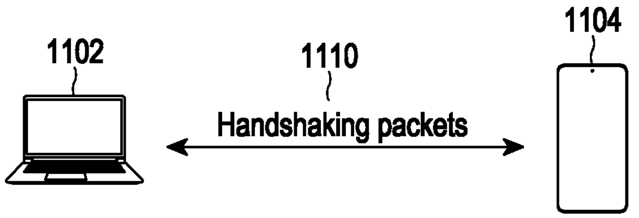
FIG. 11 illustrates a case of failed file sharing operations.

FIG. 11 illustrates a case where file sharing is failed.

Referring to FIG. 11, an electronic device 1102 (e.g., the first electronic device 200) initiating a file sharing service may perform group owner negotiations with a second electronic device 1104 (e.g., the second electronic device 250) to establish a Wi-Fi Direct-based P2P connection. In an example, a Wi-Fi P2P channel used for the group owner negotiation may be a public channel of 2.4 GHz (e.g., channel 1, channel 6, or channel 11 as defined by the Wi-Fi Direct standard). Excessive traffic or packet interference on the public channel, or concurrent use of Wi-Fi Direct and a wireless local area network (WLAN), may cause loss of a number of handshaking packets (e.g., at least one negotiation request packet, at least one negotiation response packet, and at least one negotiation confirmation packet) associated with the group owner negotiation on the Wi-Fi P2P channel. The group owner negotiation may fail in a case that at least one of the handshaking packets is lost or delayed.

For example, since the Wi-Fi P2P channel does not support persistent pairing, the first electronic device 1102 and the second electronic device 1104 may not trust the handshaking messages exchanged over the Wi-Fi P2P channel.

For example, the design of the first electronic device 1102 and the second electronic device 1104 may be out of synchronized with a driver software, resulting in packet loss or packet errors during the group owner negotiation over the Wi-Fi P2P channel.

Figure 12:
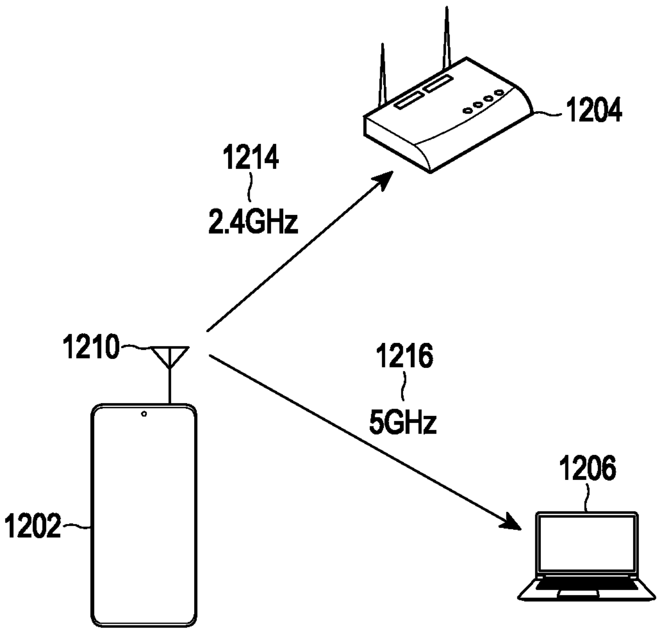
FIG. 12 illustrates operations of selecting a frequency band according to an embodiment of the disclosure.

FIG. 12 illustrates operations of selecting frequency bands.

Referring to FIG. 12, when an electronic device 1202 (e.g., the first electronic device 200) commonly uses a single antenna 1210 for both a P2P connection and a WLAN connection through multiple frequency bands (e.g., 2.4 GHz (indicated by reference numeral 1214) and/or 5 GHz (indicated by reference numeral 1216)), the Wi-Fi Direct-based P2P connection may become unstable and disconnected, or data transmission performance may deteriorate.

For example, the electronic device 1202 having the single antenna 1210 may establish a WLAN connection with an electronic device 1204 (e.g., an access point (AP)) by using a 2.4 GHz frequency band 1214 and simultaneously establish a Wi-Fi P2P connection with an electronic device 1206 by using a 5 GHz frequency band 1216 via the single antenna 1210. The electronic device 1202 communicates with the electronic device 1204 and the electronic device 1206 by using the single antenna 1210, and thus, this may result in a slower data transmission rate for the Wi-Fi P2P connection.

Figure 13:
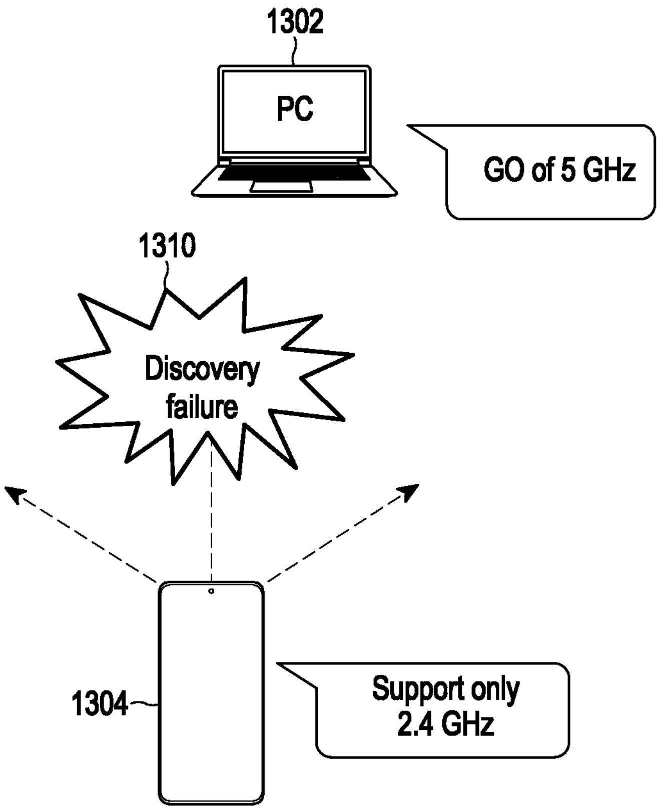
FIG. 13 illustrates a group owner negotiation using a default frequency band according to an embodiment of the disclosure.

FIG. 13 illustrates group owner negotiation using a default frequency band according to an embodiment of the disclosure.

Referring to FIG. 13, an electronic device 1302 (e.g., the first electronic device 200) may be configured to use a default (pre-designated) frequency band (e.g., 5 GHz or 6 GHz) for a Wi-Fi Direct-based P2P connection. For example, the operating system (OS) platform of the electronic device 1302 may not to allow a frequency selection for a GO and configured to use a default frequency band.

An electronic device 1304 (e.g., the second electronic device 250), which is operated as a group client (GC), may be configured to support only a 2.4 GHz frequency band and may not support the default frequency band (e.g., 5 GHz or 6 GHZ) selected by electronic device 1302, and thus, in operation 1310, the electronic device 1304 may fail to discover the electronic device 1302 that is a GO. For example, the electronic device 1304 may not be able to send a connection request to the electronic device 1302 that uses the default frequency band.

In an embodiment, capability information (e.g., device capability information) related to Wi-Fi direct communication may be shared between a plurality of the electronic devices (e.g., the first electronic device 200 and the second electronic device 250) to perform group owner negotiations for P2P communication based on Wi-Fi Direct without using a Wi-Fi P2P channel. The first electronic device 200 and the second electronic device 250 may perform a group owner selection or a frequency selection to be used for the group owner operation based on the shared capability information.

In an embodiment, electronic devices (e.g., the first electronic device 200 and/or second electronic device 250) performing Wi-Fi direct communication may use Bluetooth technology (e.g., Bluetooth legacy and/or BLE) to reduce power consumption and cost required to perform a P2P group formation over Wi-Fi Direct. Since Bluetooth technology is designed to consume less power than Wi-Fi technology, at least a part of information (e.g., the capability information) required to perform the P2P group formation may be shared using Bluetooth technology between the electronic devices (e.g., the first electronic device 200 and/or second electronic device 250) that desire to participate in the P2P group, thereby reducing power consumption and reducing the probability of failed negotiations.

In an embodiment, the electronic devices (e.g., the first electronic device 200 and/or second electronic device 250) performing Wi-Fi direct communication may use a Bluetooth channel (e.g., BT/BLE channel) to share capability information related to group owner selection and frequency selection to configure a Wi-Fi P2P 1:N network.

Figure 14A:
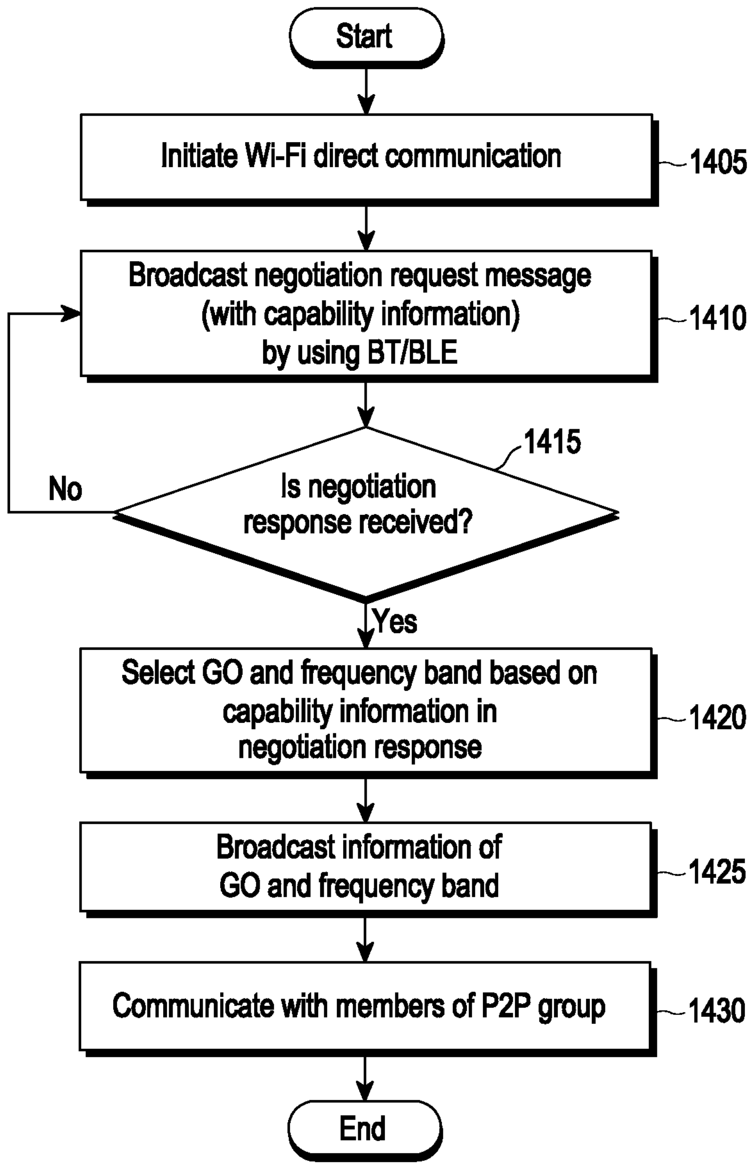
FIG. 14A illustrates a procedure for group owner negotiation according to an embodiment of the disclosure.

FIG. 14A illustrates a procedure for a group owner negotiation according to an embodiment of the disclosure. According to embodiments, at least one of operations, which will be described later, may be executed by first electronic device 200 (e.g., the processor 210). According to embodiments, at least one of operations, which will be described later, may be omitted, modified, or executed in a different order.

Referring to FIG. 14A, in operation 1405, the first electronic device 200 (or the processor 210) may determine to initiate Wi-Fi direct communication. In an embodiment, the first electronic device 200 (or the processor 210) may determine to initiate Wi-Fi direct communication based on an execution of an application that requires Wi-Fi direct communication (e.g., a file sharing application, a multi-control application, or a continuity application).

In operation 1410, the first electronic device 200 (or the processor 210) may broadcast an advertising packet including a negotiation request message (e.g., a negotiation request message 2012) for a group owner negotiation, for example, by the BT/BLE module 222 through a communication channel based on Bluetooth technology (e.g., a BT/BLE advertising channel). In an embodiment, the first electronic device 200 (or the processor 210) may include the negotiation request message for group owner negotiation in an advertising packet based on Bluetooth or BLE (hereinafter “BT/BLE”). The first electronic device 200 (or the processor 210) may initiate performing BT/BLE advertising (e.g., broadcasting the advertising packet), based on identifying of, in operation 1405, the initiation of the Wi-Fi direct communication. The first electronic device 200 (or the processor 210) may periodically broadcast the advertising packet including the negotiation request message according to a designated advertising interval.

The negotiation request message may include capability information (e.g., first capability information 2012*b*) associated with Wi-Fi direct communication of the first electronic device 200. In an embodiment, the first capability information is associated with the first electronic device 200, and may include at least one of platform information (e.g., platform information 2022*a*), network information (e.g., network information 2022*b*), or application context (e.g., application context 2022*c*) of the first electronic device 200.

The platform information may indicate the type of OS of the first electronic device 200. In an embodiment, the platform information may indicate whether the first electronic device uses an OS requiring that a default frequency band is used for Wi-Fi direct communication rather than allowing a frequency selection for a GO. In an embodiment, the platform information may include at least one of the following fields:

- OS type [1: Windows™, 2: Android™, 3: Linux™];
- Device type [1: mobile, 2: tablet, 3: desktop, 4: laptop, 6: watch];
- Wi-Fi driver manufacturer [1: Intel™, 2: Qualcomm™];
- Wi-Fi driver version; or
- Wi-Fi antenna count.

The network information may include at least one of an intent value of the first electronic device 200, information indicating a P2P role (e.g., at least one of a group owner or a group client), or available band information indicating a frequency band available for Wi-Fi direct communication (e.g., at least one of 2.4 GHz, 5 GHZ, or 6 GHz). In an embodiment, the network information may include at least one of the following fields:

- Available band [1:2.4 GHz, 2:5 GHz];
- current P2P role; or
- connected AP information [AP connection state and frequency band thereof].

The application context may include information related to the APP 212 (e.g., a file sharing application, a multi-control application, or a continuity application) executed by the first electronic device 200 (or the processor 210) to perform Wi-Fi direct communication.

- Device ID [P2P media access control (MAC) address];
- Wi-Fi direct connection type [1: legacy, 2: non-legacy];
- packet information (packet info) [1: request, 2: response, 3: confirmation]; or
- Identity information (identity info)

In an embodiment, the identification information may be generated by the APP 212 of the first electronic device 200 and determined to be identifiable by the APP 262 of the second electronic device 250.

In operation 1415, the first electronic device 200 (or the processor 210) may determine whether a negotiation response message (e.g., a negotiation response message 2014) corresponding to the negotiation request message is received by the BT/BLE module 222 from the at least one nearby electronic device (e.g., the second electronic device 250). In an embodiment, the negotiation response message may be transferred from the second electronic device 250 through a BT/BLE channel corresponding to (or which is the same as) a BT/BLE channel through which the advertising packet including the negotiation request message has been transmitted. In an embodiment, the second electronic device 250 may broadcast the negotiation response message by including the same in a BT/BLE-based advertising packet or scan request packet. The first electronic device 200 (or the processor 210) may perform the advertising packet broadcast of operation 1410 until the negotiation response message is received. Upon receiving the negotiation response message, the first electronic device 200 (or the processor 210) may proceed to operation 1420.

In an embodiment, the first electronic device 200 (or the processor 210) may perform broadcasting of the advertising packet including the negotiation request message during a designated time period, so as to receive a plurality of negotiation response messages from one or more nearby electronic devices (e.g., the second electronic device 250 and other electronic devices).

In operation 1420, the first electronic device 200 (or the processor 210) may select a GO of the P2P group based on Wi-Fi Direct-based on capability information of the second electronic device 250 (e.g., second capability information 2014*b*) included in the negotiation response message, and may select a frequency band to be used by the GO.

In an embodiment, the second capability information is associated with the second electronic device 250. In an embodiment, the second capability information may include at least one of platform information (e.g., platform information 2024*a*), network information (e.g., network information 2024*b*), or application context (e.g., application context 2024*c*) of the second electronic device 250. The platform information, network information, or application information may be defined similarly to the platform information, network information, or application information of the first capability information.

In an embodiment, the first electronic device 200 (or the processor 210) may select whether the first electronic device 200 operates as a group owner or a group client, based on the first and second capability information (e.g., an intent value and/or available band information). In an embodiment, the first electronic device 200 (or the processor 210) may select, based on the first and second capability information (e.g., platform information), an electronic device (e.g., the first electronic device 200 or another electronic device) including a platform that supports frequency selection to be used in the group owner operation as a group owner, so as to enable a group owner frequency band not to be randomly selected by platform logic.

In an embodiment, the first electronic device 200 (or the processor 210) may, in case that the first electronic device 200 is determined to operate as a group owner, select a frequency band for the first electronic device 200 to use for group owner operation based on first and second capability information (e.g., available band information). In an embodiment, the first electronic device 200 (or the processor 210) may select a frequency band that is available by all the nearby electronic devices (e.g., the second electronic device 250 and other electronic devices) based on one or more pieces of third capability information received from the nearby electronic devices.

In an embodiment, the first electronic device 200 (or the processor 210) may, in a case that when the first electronic device 200 has a single antenna (e.g., the single antenna 1210) and the first electronic device 200 is communicating via a WLAN connection with external electronic devices, select to use the frequency band for group owner operation different from the frequency band used for the WLAN connection.

In operation 1425, the first electronic device 200 (or the processor 210) may broadcast a negotiation confirmation message, including information indicating a result of the selection of group owner and frequency band (e.g., group owner information), by the BT/BLE module 222 by using a communication channel based on Bluetooth technology. In an embodiment, the first electronic device 200 (or the processor 210) may include the negotiation confirmation message in an advertising packet based on Bluetooth or BLE (hereinafter, "BT/BLE"). In an embodiment, the negotiation confirmation message may include information (e.g., media access control (MAC) address) identifying the electronic device (e.g., the first electronic device 200) selected as the group owner. In an embodiment, the negotiation confirmation message may include frequency band information indicating the selected frequency band. The negotiation confirmation message may be received by nearby electronic devices, such as the electronic devices that transmitted the negotiation response messages of operation 1415 (e.g., the second electronic device 250 and other electronic devices).

In an embodiment, the first electronic device 200 (or the processor 210) may omit operation 1425 in case that the first electronic device 200 is determined not to operate as a group owner, and the first electronic device 200 (or the processor 210) may receive a negotiation confirmation message broadcast by an external electronic device (e.g., the second electronic device 250) that has been selected as the group owner. Upon receiving the negotiation confirmation message, the first electronic device 200 (or the processor 210) may identify the second electronic device 250 operating as a GO and confirm the frequency band used by the second electronic device 250.

In operation 1430, after transmitting the negotiation confirmation message, the first electronic device 200 (or the processor 210) may establish a Wi-Fi Direct-based P2P connection with electronic devices (e.g., the second electronic device 250 and other electronic devices) that received the negotiation confirmation message so as to configure a P2P group with the electronic devices, and may communicate with (e.g., transmit or receive media data to or from) the electronic devices through the Wi-Fi module 224 within the P2P group. In an embodiment, operation 1430 may include at least one of operation 1435, operation 1440, operation 1445, operation 1450, or operation 1455 of FIG. 14B.

Figure 14B:
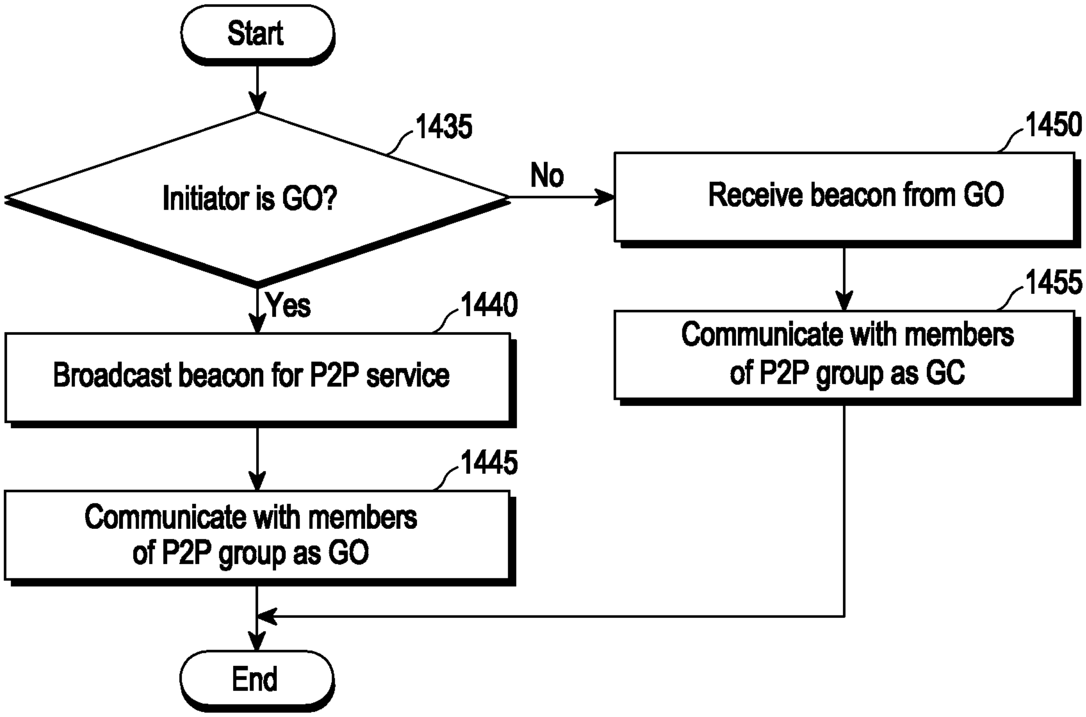
FIG. 14B illustrates operations of establishing a Wi-Fi direct connection according to an embodiment of the disclosure.

FIG. 14B illustrates operations of establishing a Wi-Fi direct connection according to an embodiment of the disclosure. According to embodiments, at least one of operations which will be described later may be executed by first electronic device 200 (or the processor 210). According to embodiments, at least one of operations which will be described later may be omitted, modified, or executed in a different order.

Referring to FIG. 14B, in operation 1435, the first electronic device 200 (or the processor 210) may determine whether the first electronic device 200, which is the initiator of the Wi-Fi direct communication, has been selected as a group owner. In an embodiment, based on the first intent value included in the negotiation request message transmitted in operation 1410 and the second intent values received from the one or more external electronic devices in operation 1415, the first electronic device 200 (or the processor 210) may select the first electronic device 200 as the group owner in case that the first intent value is larger than the second intent values. In case that the first intent value is not larger than the second intent values, the first electronic device 200 (or the processor 210) may select the external electronic device (e.g., the second electronic device 250) having the largest second intent value as the group owner.

In a case that the first electronic device 200 is selected as a GO, the first electronic device 200 (or the processor 210) may proceed to operation 1440. On the other hand, in another case that the first electronic device 200 is not selected as a GO, the first electronic device 200 (or the processor 210) may proceed to perform operation 1450.

In operation 1440, the first electronic device 200 (or the processor 210) may broadcast a beacon signal for the P2P service through the Wi-Fi module 224. In an embodiment, the beacon signal may be transmitted through the frequency band selected in operation 1420.

In operation 1445, the first electronic device 200 (or the processor 210) may configure a P2P group with one or more group client devices (e.g., the second electronic device 250) that have received the beacon signal, and may communicate with the group client devices (e.g., transmit or receive media data thereto or therefrom).

In operation 1450, the first electronic device 200 (or the processor 210) may receive a beacon signal from an external electronic device (e.g., the second electronic device 250) selected as a GO. In an embodiment, the first electronic device 200 (or the processor 210) may receive a negotiation confirmation message of the second electronic device 250 from the second electronic device 250 through a BT/BLE channel, may identify that the second electronic device 250 has been selected as a GO, based on information (e.g., group owner information) included in the negotiation confirmation message, and may confirm a frequency band to be used by the second electronic device 250 to operate as a GO. The first electronic device 200 (or the processor 210) may receive a beacon signal from the second electronic device 250 through the confirmed frequency band.

In operation 1455, the first electronic device 200 (or the processor 210) may configure a P2P group with the group owner device (e.g., the second electronic device 250) that transmitted the beacon signal and other group client devices, and may communicate with (e.g., transmit or receive media data to or from) the group owner device and other group client devices.

Figure 15:
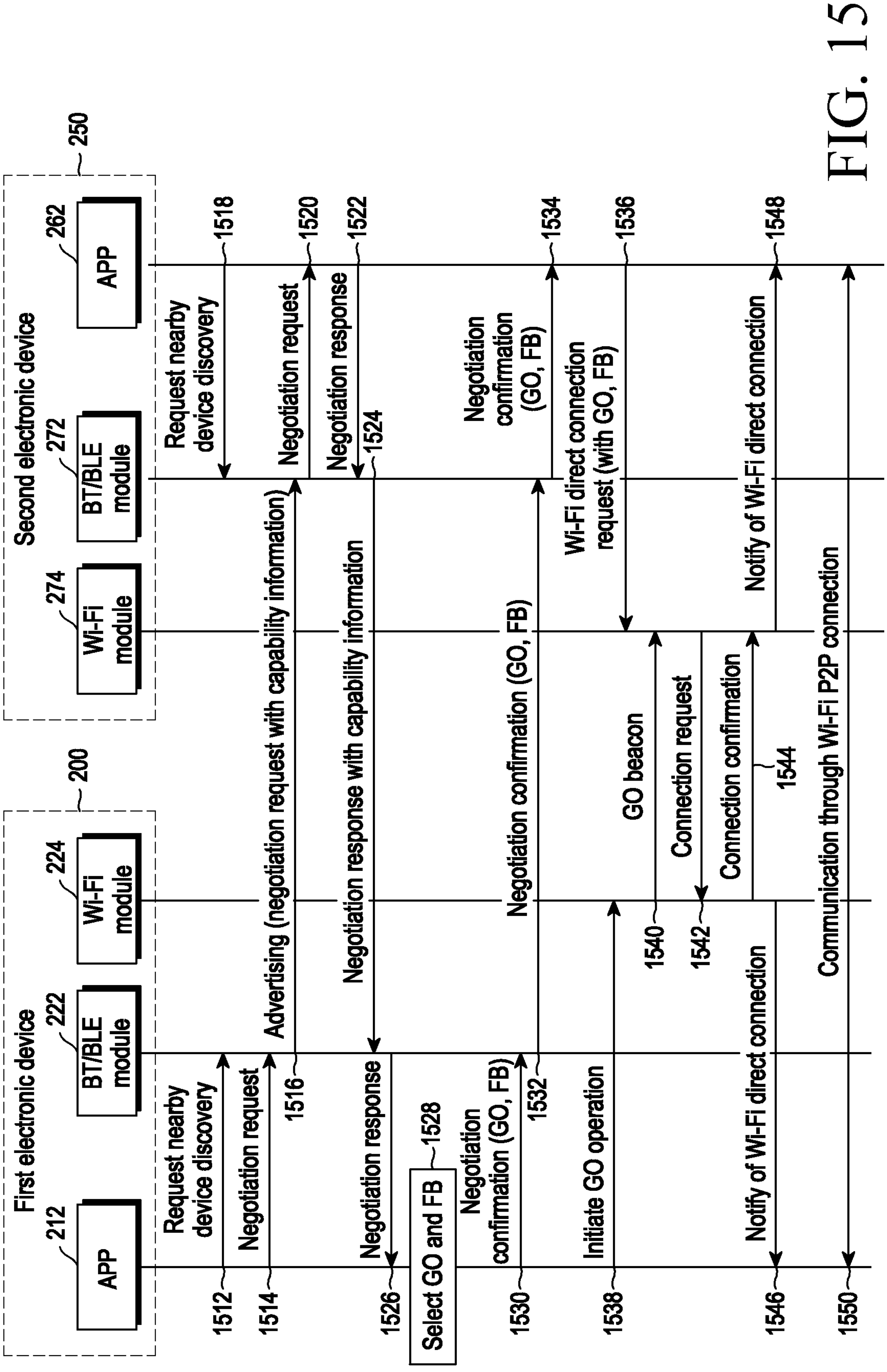
FIG. 15 illustrates a procedure for selecting a group owner and a frequency band according to an embodiment of the disclosure.

FIG. 15 illustrates a procedure for selecting a group owner and a frequency band according to an embodiment of the disclosure. According to embodiments, at least one of operations which will be described later may be omitted, modified, or executed in a different order.

Referring to FIG. 15, in operation 1512, the first electronic device 200 (e.g., the APP 212 executed by the processor 210) may request nearby device search from the BT/BLE module 222 to initiate Wi-Fi direct communication. In an embodiment, the first electronic device 200 (or the processor 210) may request nearby device search from the BT/BLE module 222 based on execution of the APP 212 (e.g., a file sharing application, a multi-control application, or a continuity application) using Wi-Fi direct communication. The BT/BLE module 222 may begin to perform BLE advertising and scanning (e.g., listening) based on being requested to perform the nearby device search.

In operation 1514, the first electronic device 200 (or the APP 212) may transmit a negotiation request including capability information associated with Wi-Fi direct communication to the BT/BLE module 222. In an embodiment, the first electronic device 200 (or the APP 212) may request the BT/BLE module 222 to broadcast an advertising packet including the capability information associated with the Wi-Fi direct communication.

In operation 1516, the first electronic device 200 (e.g., the BT/BLE module 222) may broadcast an advertising packet (e.g., a BT/BLE advertising packet) including a negotiation request message through a Bluetooth advertising channel. In an embodiment, the advertising packet may further include application-specific data (e.g., application context) associated with the APP 212. In an embodiment, the negotiation request message may include capability information (e.g., the first capability information) associated with Wi-Fi direct communication of the first electronic device 200. In an embodiment, the first capability information may include at least one of network information, platform information, or application context.

In operation 1518, the second electronic device 250 (e.g., the APP 262 executed by the processor 260) may request nearby device search from the BT/BLE module 272 to initiate Wi-Fi direct communication. In an embodiment, the second electronic device 250 (e.g., the processor 260) may request nearby device search from the BT/BLE module 272 based on the execution of the APP 262 (e.g., a file sharing application, a multi-control application, or a continuity application) that uses Wi-Fi direct communication. The BT/BLE module 272 may begin performing BLE advertisement and scanning (e.g., listening) based on being requested to perform the nearby device search.

In operation 1520, the second electronic device 250 (or the BT/BLE module 272) may transfer a negotiation request message included in the advertising packet to the APP 262 based on receiving the advertising packet of operation 1516 via BT/BLE scanning. The second electronic device 250 (or the APP 262) may obtain the first capability information of the first electronic device 200 included in the negotiation request message. In operation 1522, the second electronic device 250 (or the APP 262) may transfer a negotiation response message corresponding to the negotiation request message to the BT/BLE module 272. In an embodiment, the negotiation response message may include capability information (e.g., second capability information) associated with the Wi-Fi direct communication of the second electronic device 250. In an embodiment, the second capability information may include at least one of network information, platform information, or application context.

In operation 1524, the second electronic device 250 (or the BT/BLE module 272) may broadcast the negotiation response message. In an embodiment, the negotiation response message may be included in an advertising packet based on BT/BLE and broadcast.

In operation 1526, the first electronic device 200 (or the BT/BLE module 222) may receive the negotiation response message and transfer the same to the APP 212. In an embodiment, the first electronic device 200 (or the BT/BLE module 222) may repeatedly transmit the negotiation request message of operation 1516 until negotiation response messages are received from one or more nearby electronic devices (e.g., the second electronic device 250 and other electronic devices). The first electronic device 200 (or the BT/BLE module 222) may transfer the negotiation response messages received from one or more nearby electronic devices (e.g., the second electronic device 250) to the APP 212. In an embodiment, the first electronic device 200 (or the BT/BLE module 222) may transmit a negotiation confirmation message for confirming reception of the negotiation response message to the second electronic device 250.

In operation 1528, the first electronic device 200 (or the APP 212) may select a group owner for the Wi-Fi Direct-based P2P group, based on the first capability information of operation 1514 and the second capability information in the negotiation response message obtained in operation 1526, and may select a frequency band to be used to operate as a group owner in case that the first electronic device 200 is selected as the group owner. In an embodiment, the first electronic device 200 (e.g., the APP 212) may select one group owner from among the first electronic device 200 and one or more nearby electronic devices (e.g., the second electronic device 250 and other electronic devices) having been transmitted the negotiation response message of operation 1524. In an embodiment, the first electronic device 200 (e.g., the APP 212) may perform a selection of a frequency band in case that the first electronic device 200 is selected as the group owner.

In operation 1530, the first electronic device 200 (e.g., the APP 212) may transfer a negotiation confirmation message including the result of the selection of the group owner and frequency band (e.g., group owner information) to the BT/BLE module 222. In operation 1532, the first electronic device 200 (e.g., the BT/BLE module 222) may broadcast the negotiation confirmation message. In an embodiment, the group owner information within the negotiation confirmation message may include a GO MAC address (e.g., “GO”) and/or frequency band information (e.g., “FB”). In an embodiment, the negotiation confirmation message may be included in an advertising packet based on BT/BLE and broadcast.

In operation 1538, the first electronic device 200 (or the APP 212) may instruct the Wi-Fi module 224 to initiate group owner operation based on the negotiation confirmation message. In an embodiment, the first electronic device 200 (or the APP 212) may transfer the negotiation confirmation message (e.g., GO MAC and/or frequency band information) to the Wi-Fi module 224 to operate in an autonomous group owner mode. In operation 1540, the first electronic device 200 (or the Wi-Fi module 224) may transmit, upon performing the group owner operation, beacon signals (e.g., at least one beacon packet) in a frequency band indicated by the frequency band information. Since the first electronic device 200 (or the Wi-Fi module 224) has already obtained the negotiation confirmation message, the first electronic device may begin beacon broadcasting without having to proceed with the group owner negotiation.

In operation 1534, the second electronic device 250 (or the BT/BLE module 272) may transfer the negotiation confirmation message having been received from the first electronic device 200 through the BT/BLE channel to the APP 262. In an embodiment, the second electronic device 250 (or the BT/BLE module 272) may receive an advertising packet including the negotiation confirmation message through BT/BLE scanning.

In operation 1536, the second electronic device 250 (or the APP 262) may identify (e.g., discover) the existence of the first electronic device 200 capable of Wi-Fi direct communication based on the negotiation confirmation message, and may instruct the Wi-Fi module 274 to establish a Wi-Fi direct connection with the first electronic device 200. In an embodiment, the second electronic device 250 (or the APP 262) may instruct the Wi-Fi module 274 to receive a beacon from the group owner (e.g., the first electronic device 200) in a designated frequency band (e.g., “FB”), based on the negotiation confirmation message.

The second electronic device 250 (or the Wi-Fi module 274) may identify that the first electronic device 200 operates as a GO for a Wi-Fi Direct-based P2P connection, based on the negotiation confirmation message, and may initiate monitoring to receive a beacon signal transmitted from the first electronic device 200.

In operation 1540, the second electronic device 250 (or the Wi-Fi module 274) may receive a beacon signal (e.g., at least one beacon packet), which is transmitted by the first electronic device 200, in the frequency band indicated by the frequency band information included in the negotiation confirmation message. In operation 1542, the second electronic device 250 (or the Wi-Fi module 274) may transmit a connection request packet to the first electronic device 200 discovered by the beacon signal. In operation 1544, the first electronic device 200 (or the Wi-Fi module 224) may transmit a connection confirmation packet corresponding to the connection request packet to the second electronic device 250.

In operation 1546, the first electronic device 200 (or the Wi-Fi module 224) may transfer, to the APP 212, a signal indicating that a Wi-Fi direct connection (e.g., P2P connection) with the second electronic device 250 has been established by exchanging the connection request packet and the connection confirmation packet.

In operation 1548, the second electronic device 250 (or the Wi-Fi module 274) may transfer, to the APP 262, a signal indicating that a Wi-Fi direct connection (e.g., P2P connection) with the first electronic device 200 has been established by exchanging the connection request packet and the connection confirmation packet.

In operation 1550, the first electronic device 200 (or the APP 212) and the second electronic device 250 (or the APP 262) may perform communication (e.g., file sharing service, multi-control service, or continuity service) through the Wi-Fi direct connection (e.g., the P2P connection).

Figure 16:
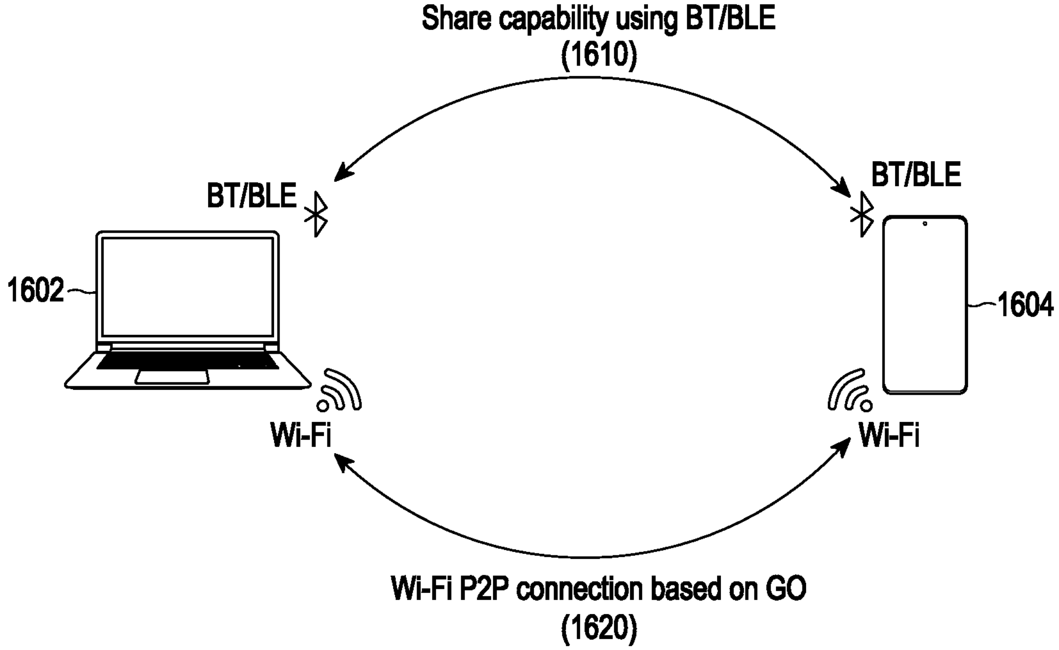
FIG. 16 illustrates group owner negotiation operations using Bluetooth technology according to an embodiment of the disclosure.

FIG. 16 illustrates group owner negotiation using Bluetooth technology according to an embodiment of the disclosure.

Referring to FIG. 16, an electronic device 1602 (e.g., the first electronic device 200) may include at least two wireless modules (e.g., the Wi-Fi module 224 and the BT/BLE module 222) in order to establish a Wi-Fi Direct-based P2P connection based on capability information. An electronic device 1604 (e.g., the second electronic device 250) may include at least two wireless modules (e.g., the Wi-Fi module 274 and the BT/BLE module 272) in order to establish a Wi-Fi Direct-based P2P connection based on capability information.

The electronic device 1602 and/or the electronic device 1604 may perform (an operation of) capability sharing 1610 to select a group owner of a P2P group by using another communication technology (e.g., at least one of BT or BLE) that consumes relatively low power compared to Wi-Fi communication technology. In an embodiment, the capability sharing 1610 may include the electronic device 1602 and/or electronic device 1604 exchanging their respective capability information (e.g., network information, platform information, and/or available band information) with each other (e.g., operation 1524 and operation 1532).

The electronic device 1602 and/or the electronic device 1604 may establish a Wi-Fi direct-based P2P connection 1620 by using Wi-Fi communication technology based on the capability information (e.g., first capability information and/or second capability information) obtained through the capability sharing 1610.

Figure 17:
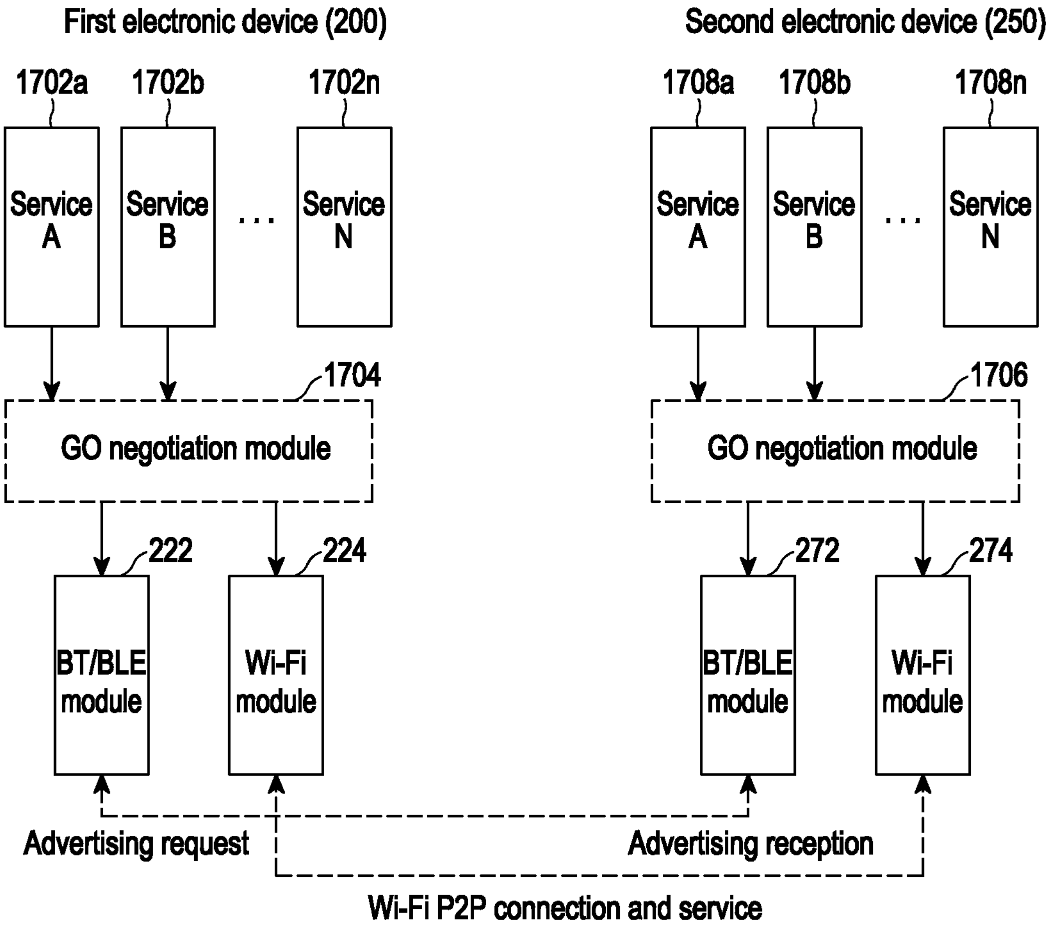
FIG. 17 illustrates group owner negotiation operations using BT/BLE channels according to an embodiment of the disclosure.

FIG. 17 illustrates group owner negotiation using a BT/BLE channel according to an embodiment of the disclosure.

Referring to FIG. 17, the first electronic device 200 may execute at least one service (e.g., service A 1702*a*, service B 1702*b*, . . . and service N 1700*n*) using Wi-Fi direct communication. In an embodiment, the at least one service may be executed by a respective application (e.g., the APP 212).

The first electronic device 200 may include a GO negotiation module 1704, which is logic-responsible for group owner negotiation. In an embodiment, the GO negotiation module 1704 may be executed by the processor 210 of the first electronic device 200 or implemented as software logic included in the processor 210. The GO negotiation module 1704 may control the BT/BLE module 222 to broadcast an advertising packet that includes first capability information (e.g., network information, platform information, and/or application context) of the first electronic device 200 based on the execution of at least one service (e.g., service A 1702*a*, service B 1702*b*, . . . , and service N 1702*n*) by the first electronic device 200.

The second electronic device 250 may execute at least one service (e.g., service A 1708*a*, service B 1708*b*, . . . , and service N 1708*n*), each corresponding to at least one service (e.g., service A 1702*a*, service B 1702*b*, . . . , and service N 1702*n*) of the first electronic device 200. The second electronic device 250 may include a GO negotiation module 1706, which is logic responsible for group owner negotiations. The GO negotiation module 1706 may be executed by the processor 260 of the second electronic device 250, for example, or may be implemented as software logic included in the processor 260. The GO negotiation module 1706 may control the BT/BLE module 272 to perform a BT/BLE scan to receive an advertising packet including the first capability information based on the execution of at least one service (e.g., service A 1708*a*, service B 1708*b*, . . . , and service N 1708*n*) by the second electronic device 250.

The BT/BLE module 272 of the second electronic device 250 may receive the advertising packet including the capability information from the first electronic device 200, and the GO negotiation module 1706 may control the BT/BLE module 272 to broadcast a negotiation response message including the second capability information (e.g., network information, platform information, and/or application context) of the second electronic device 250.

The GO negotiation module 1704 of first electronic device 200 may select a group owner and a frequency band based on first capability information and capability information (e.g., second capability information) received from one or more nearby electronic devices (e.g., the second electronic device 250 and other electronic devices). The GO negotiation module 1704 may control the BT/BLE module 222 to broadcast a negotiation confirmation message indicating the result of the selection of the group owner and the selection of frequency band to neighboring electronic devices (e.g., the second electronic device 250 and other electronic devices).

In a case that the first electronic device 200 is selected as a group owner, the GO negotiation module 1704 may control the Wi-Fi module 224 to perform group owner operation using the selected frequency band. The Wi-Fi module 224 may perform group owner operation (e.g., broadcast of beacons) in the selected frequency band. Nearby electronic devices (e.g., the second electronic device 250 and other electronic devices) other than the first electronic device 200 may configure a P2P group with the first electronic device 200 by receiving a beacon signal broadcast from the first electronic device 200 and be connected to the first electronic device 200.

In a case that an electronic device (e.g., the second electronic device 250) other than the first electronic device 200 is selected as a group owner, the first electronic device 200 (e.g., the GO negotiation module 1704) may control the Wi-Fi module 224 to operate as a group client without broadcasting the negotiation confirmation message. The Wi-Fi module 224, which operates as a group client, may monitor the selected frequency band (and other frequency bands) to receive beacon signals broadcast in the selected frequency band from the electronic device (e.g., the second electronic device 250) selected as the group owner.

Figure 18:
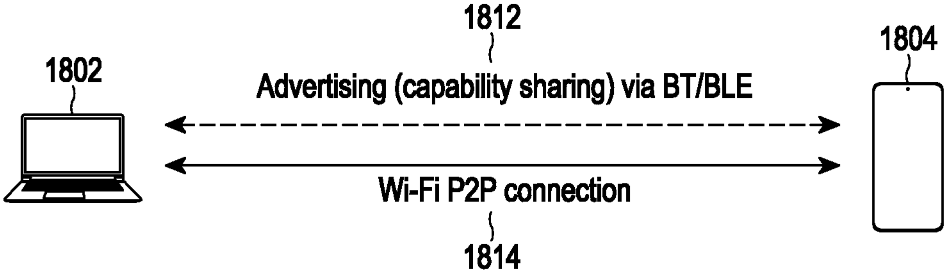
FIG. 18 illustrates the exchange of capability information according to an embodiment of the disclosure.

FIG. 18 illustrates the exchange of capability information according to an embodiment of the disclosure.

Referring to FIG. 18, in operation 1812, an electronic device 1802 (e.g., the first electronic device 200) and an electronic device 1804 (e.g., the second electronic device 250) may exchange their respective capability information by using advertising through a BT/BLE channel. In an embodiment, the electronic device 1802 may broadcast its capability information (e.g., first capability information) through a BT/BLE advertising channel, and the electronic device 1804 may broadcast its capability information (e.g., second capability information) through the BT/BLE advertising channel, for example, after obtaining the first capability information via BT/BLE scanning. The capability sharing of operation 1812 through the BT/BLE advertising channel may be completed in a short period of time, such as within one second.

In a case that electronic device 1802 is the initiator of the Wi-Fi direct communication, the electronic device 1802 may determine (e.g., select) a group owner of the P2P group based on the second capability information received from the electronic device 1804. In an embodiment, it may be determined that the electronic device 1802 serves the role of group owner and the electronic device 1804 serves the role of group client.

In operation 1814, the electronic device 1802, which is selected as the group owner, may establish a Wi-Fi direct connection with the electronic device 1804 via a group owner operation (e.g., broadcasting a beacon) and configure a P2P group that includes the electronic device 1802 and the electronic device 1804.

Figure 19:
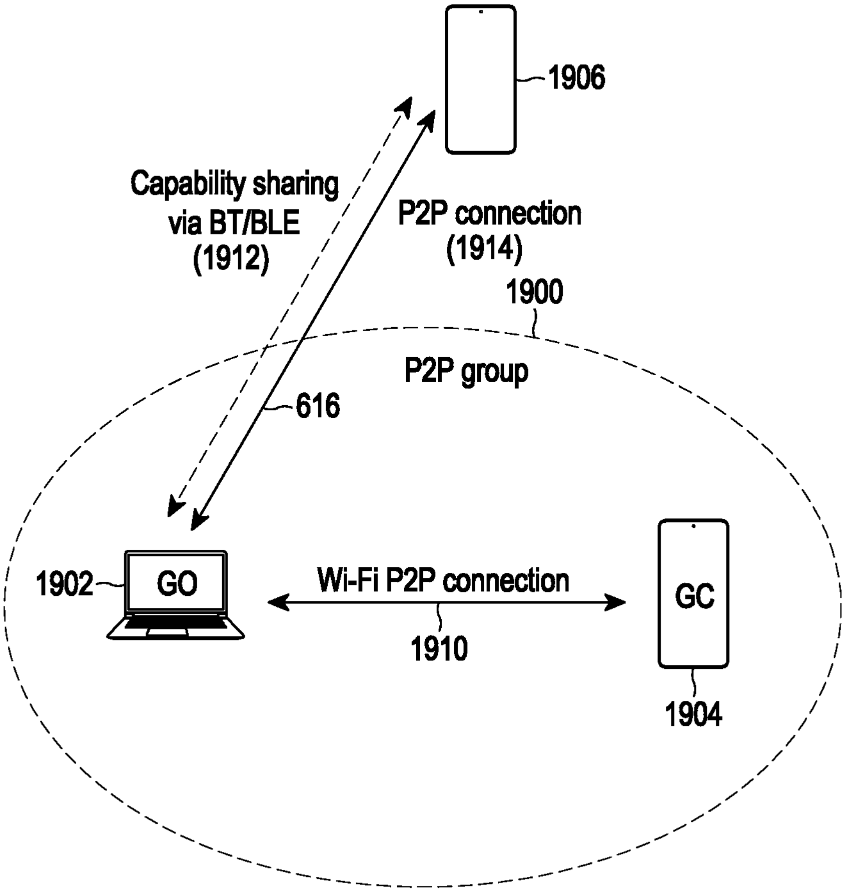
FIG. 19 illustrates selection of a group owner according to an embodiment of the disclosure.

FIG. 19 illustrates selection operations of a group owner according to an embodiment of the disclosure.

Referring to FIG. 19, in operation 1910 (e.g., time T1), an electronic device 1902 (e.g., the first electronic device 200) may establish a Wi-Fi Direct-based P2P connection with an electronic device 1904 and configure a P2P group 1900. In an embodiment, the P2P connection between the electronic device 1902 and the electronic device 1904 may be established based on capability information of the electronic device 1902 and the electronic device 1904.

In operation 1912 (e.g., time T2), the electronic device 1902 may newly discover an electronic device 1906 (e.g., the second electronic device 250) that desires to participate in the P2P group 1900, and may exchange capability information with the electronic device 1906 through a BT/BLE channel. The electronic device 1902 may select a group owner based on capability information of the electronic device 1906 acquired through the BT/BLE channel. In an embodiment, the electronic device 1902 may be selected as the group owner again based on the available frequency bands and/or platform information of the electronic devices 1902, 1904, and 1906.

In operation 1914, the electronic device 1902 may establish a P2P connection for Wi-Fi direct communication with the electronic device 1906 based on capability information of the electronic device 1906. After the P2P connection is established, the electronic device 1906 may become a new member of the P2P group 1900.

The electronic device 1902 may consider all capability information exchanged to select a group owner and/or frequency band (e.g., the capability information of the electronic device 1902, the capability information of the electronic device 1904, and the capability information of the electronic device 1906), and accordingly, all the electronic devices 1904 and 1906, including the electronic device 1906, which is a new member, may be simultaneously connected to the electronic device 1902, which is the group owner. The electronic device 1902 may establish a P2P connection with the electronic device 1906, which is a new member, based on the capability information obtained through a BT/BLE channel without performing a group owner negotiation using Wi-Fi technology. The electronic device 1902 may notify the electronic device 1906, which is a new member, of the capability information of the electronic device 1902 (e.g., the first capability information) through a negotiation request message, and accordingly, may obtain the capability information of the electronic device 1906 through a negotiation response message.

Figure 20A:
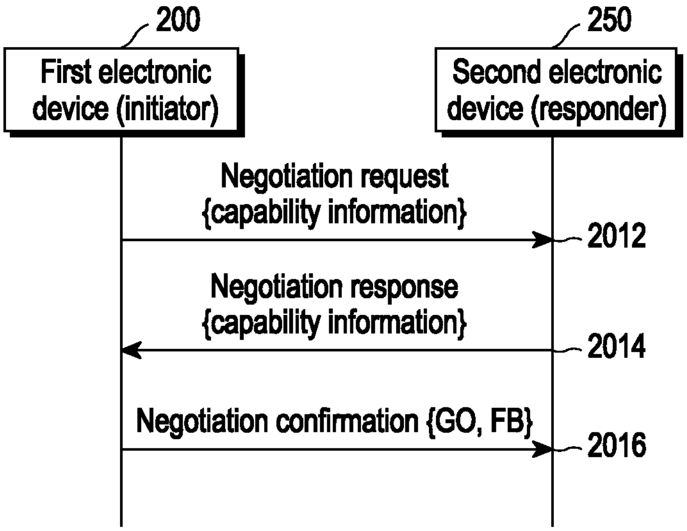
FIG. 20A illustrates packet formats for group owner negotiations according to embodiments of the disclosure.
Figure 20B:
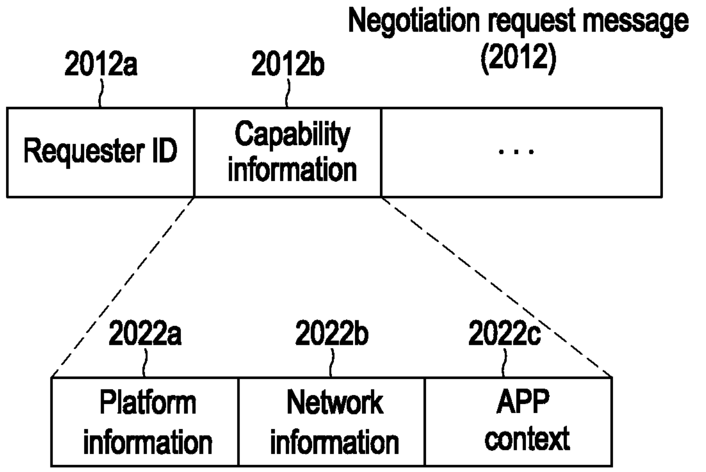
FIG. 20B illustrates packet formats for group owner negotiations according to embodiments of the disclosure.
Figure 20C:
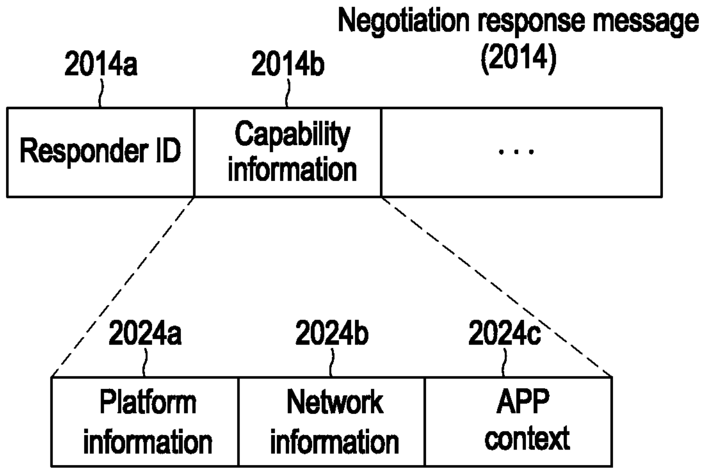
FIG. 20C illustrates packet formats for group owner negotiations according to embodiments of the disclosure.

FIG. 20A illustrates packet formats for a group owner negotiation according to embodiments of the disclosure. FIG. 20B illustrates packet formats for group owner negotiation according to embodiments of the disclosure. FIG. 20C illustrates packet formats for group owner negotiation according to embodiments of the disclosure. FIG. 20D illustrates packet formats for group owner negotiation according to embodiments of the disclosure. FIG. 20E illustrates packet formats for group owner negotiation according to embodiments of the disclosure. FIG. 20F illustrates packet formats for group owner negotiation according to embodiments of the disclosure.

Referring to FIG. 20A, the first electronic device 200, operating as an initiator to initiate Wi-Fi direct communication, may transmit (e.g., broadcast) a negotiation request message 2012 including capability information (e.g., first capability information) of the first electronic device 200 through a BT/BLE channel (e.g., an advertising channel). The negotiation request message 2012 may be received by the second electronic device 250 performing a BT/BLE scan. Based on receiving the negotiation request message 2012, the second electronic device 250 may transmit (e.g., broadcast) a negotiation response message 2014 including capability information (e.g., second capability information) of the second electronic device 250. The negotiation response message 2014 may be received by the first electronic device 200 performing the BT/BLE scan.

The first electronic device 200 may select a group owner and a frequency band based on the first capability information and the second capability information shared through the negotiation request message 2012 and the negotiation response message 2014. The first electronic device 200 may transmit (e.g., broadcast) a negotiation confirmation message 2016 indicating the selected group owner and frequency band. In an embodiment, the negotiation confirmation message 2016 may be encrypted. In an embodiment, the negotiation confirmation message 2016 may include either a first negotiation confirmation message 2016*a* of FIG. 20E or a second negotiation confirmation message 2016*b* of FIG. 20F, depending on whether the first electronic device 200 is operating in a legacy mode or a non-legacy mode in relation to the type of connection of the Wi-Fi direct communication.

Referring to FIG. 20B, the negotiation request message 2012 may at least include a capability information field 2012*b*, and may further include a requester ID field 2012*a*. In an embodiment, the capability information field 2012*b* may include at least one of platform information 2022*a*, network information 2022*b*, or application context 2022*c*.

Referring to FIG. 20C, the negotiation response message 2014 may at least include a capability information field 2014*b*, and may further include a responder ID field 2014*a*. In an embodiment, the capability information field 2014*b* may include at least one of platform information 2024*a*, network information 2024*b*, or application context 2024*c*.

Referring to FIG. 20D, the platform information 2022*a* or 2024*a* may include at least one of an OS type field indicating an OS of the first electronic device 200 or the second electronic device 250, a device type field, a Wi-Fi driver manufacturer field, a Wi-Fi driver version field, or a Wi-Fi antenna count field. The network information 2022*b* or 2024*b* may include at least one of an available band field, a current P2P role field, or a connected AP information field of the first electronic device 200 or the second electronic device 250. The application context 2022*c* or 2024*c* may include at least one of a device ID of the first electronic device 200 or the second electronic device 250, a connection type, packet information, or identification information of the first electronic device 200 or the second electronic device 250 used by an application (e.g., the APP 212 or APP 262) executing Wi-Fi direct communication.

In an embodiment, a current P2P role field 2014*c* included in the network information 2022*b* or 2024*b* may indicate a P2P role (e.g., at least one of a group owner or a group client) in an existing Wi-Fi P2P connection in case that the first electronic device 200 or the second electronic device 250 is already connected to another device by using Wi-Fi Direct. A value of the current P2P role field 2014*c* may be defined, for example, as shown in [Table 1] below.

TABLE 1

| Current P2P Role | Value |
|---|---|
| not connected | 00 |
| already GO | 01 |
| already GC | 10 |
| already both GO and GC | 11 |

Referring to FIG. 20E, a first negotiation confirmation message 2016*a* may include at least one of a packet ID field 2018*a*, a legacy state field 2018*b*, a GO MAC field 2018*c* for identifying an electronic device selected as a group owner, or a frequency band field 2018*d*. The GO MAC field 2018*c* and the frequency band field 2018*d* may be referred to herein as group owner information. The GO MAC field 2018*c* may include information (e.g., a MAC address) for identifying an electronic device (e.g., the first electronic device 200) that has been selected as the group owner among the first electronic device 200 and other electronic devices (e.g., the second electronic device 250). The frequency band field 2018*d* may indicate a frequency band selected for group owner operation when the first electronic device 200 is selected as the group owner. In an embodiment, the frequency band field 2018*d* may be determined to indicate a frequency band that can be supported by both the first electronic device 200 and other electronic devices (e.g., the second electronic device 250).

Referring to FIG. 20F, the second negotiation confirmation message 2016*b* may include at least one of a packet ID field 2020*a*, a legacy state field 2020*b*, a GO MAC field 2020*c* for identifying the electronic device selected as the group owner, a frequency band field 2020*d*, a service set ID (SSID) field 2020*e*, or a pass phrase field 2020*f*. The GO MAC field 2020*c* and the frequency band field 2020*d* may be referred to herein as group owner information. The GO MAC field 2020_a_ may include information (e.g., a MAC address) for identifying the electronic device (e.g., the first electronic device 200) selected as the group owner. The frequency band field 2020_d_ may indicate a frequency band selected by the first electronic device 200 for group owner operation. The SSID field 2020_e_ and the pass phrase field 2020_f_ may be associated with a WLAN connection that the first electronic device 200 has.

Embodiments of the disclosure may efficiently select a group owner for a one-to-many (1:N) connection, reduce latency for P2P negotiations, and support nearby electronic devices to participate in a P2P group.

Figure 21:
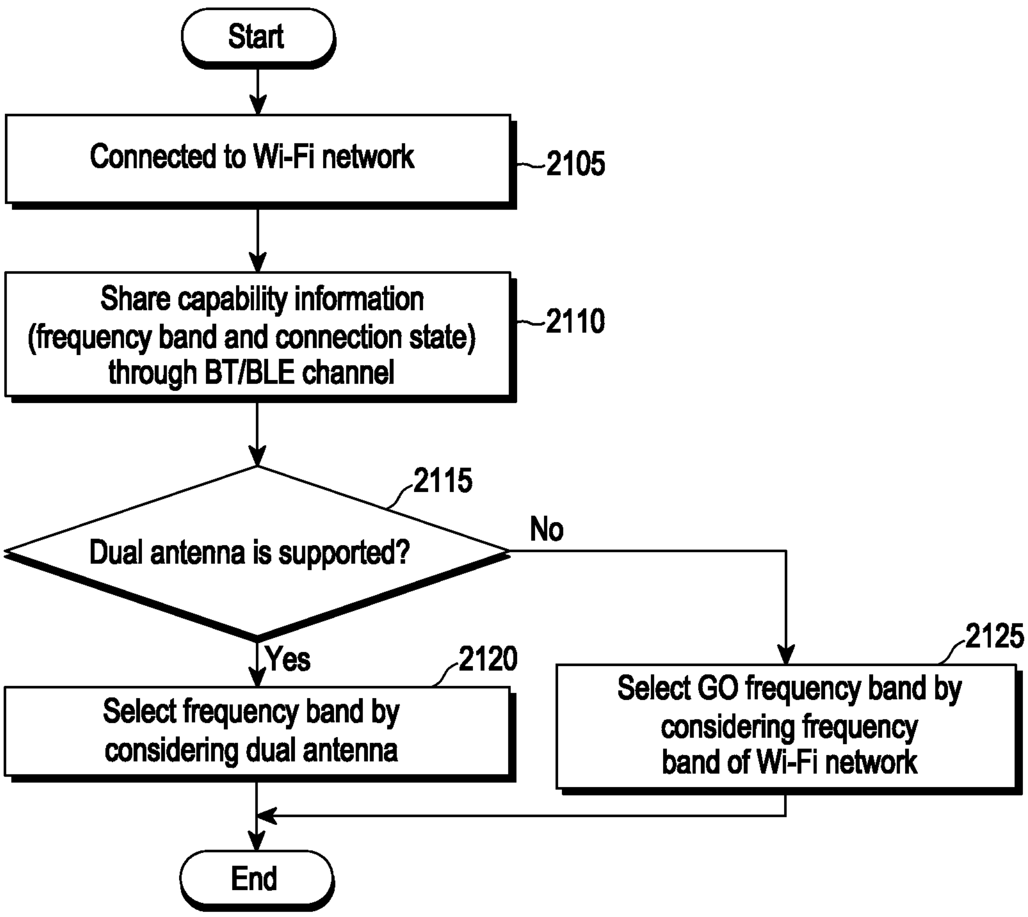
FIG. 21 illustrates frequency band selection operations based on an antenna configuration according to an embodiment of the disclosure.

FIG. 21 illustrates frequency band selection operations based on an antenna configuration according to an embodiment of the disclosure. In an embodiment, at least one of operations described below may be executed by the first electronic device 200 (or the processor 210). According to embodiments, at least one of the operations described herein may be omitted, modified, or executed in a different order.

Referring to FIG. 21, in operation 2105, the first electronic device 200 (or the processor 210) may be connected to a Wi-Fi network (e.g., an AP). In operation 2110, the first electronic device 200 (or the processor 210) may share capability information (e.g., first capability information and/or second capability information) with one or more nearby electronic devices (e.g., the second electronic device 250) to initiate Wi-Fi direct communication while having a connection (e.g., WLAN connection) with the Wi-Fi network.

In an embodiment, the first capability information may include antenna count information of the first electronic device 200, and information related to WLAN connection of the first electronic device 200 (e.g., connected AP information). In an embodiment, the second electronic device 250 may separately have a WLAN connection to the Wi-Fi network, and the second capability information may include antenna count information of the second electronic device 250 and connected AP information associated with the WLAN connection of the second electronic device 250 (e.g., information about an AP connection state and/or a frequency band being used for the WLAN connection).

In operation 2115, the first electronic device 200 (or the processor 210) may determine whether the second electronic device 250 supports dual antennas based on identifying that the first electronic device 200 has a WLAN connection and desires to initiate Wi-Fi direct communication. In an embodiment, the first electronic device 200 may determine whether the antenna count information of the second electronic device 250 indicates a value greater than "1" based on the second capability information. In case that the second electronic device 250 supports dual antennas, for example, in case that the antenna count information of the second electronic device 250 indicates a value greater than "1", the first electronic device 200 (or the processor 210) may proceed to operation 2120. If the second electronic device 250 does not support dual antennas, for example, if the antenna count information of the second electronic device 250 indicates "1", the first electronic device 200 (or the processor 210) may proceed to operation 2125.

In operation 2120, the first electronic device 200 (or the processor 210) may select a frequency band for the P2P connection, so that the second electronic device 250 can simultaneously establish a WLAN connection and a Wi-Fi Direct-based P2P connection by using the dual antennas. In an embodiment, the frequency band for the P2P connection may be selected to be the same as or different from the frequency band that the second electronic device 250 is using for the WLAN connection. In an embodiment, the frequency band for the P2P connection may be determined based on the available frequency bands of nearby electronic devices (e.g., the second electronic device 250 and other electronic devices). The second electronic device 250 may use dual antennas to simultaneously maintain a WLAN connection and a P2P connection which are using different frequency bands.

In operation 2125, the first electronic device 200 (or the processor 210) may select a frequency band for the P2P connection, so that the second electronic device 250 can use a WLAN connection and a Wi-Fi Direct-based P2P connection through a single antenna. In an embodiment, the frequency band for the P2P connection may be selected to be the same as the frequency band that the second electronic device 250 is using for the WLAN connection. The second electronic device 250 may use a single antenna to simultaneously maintain a WLAN connection and a P2P connection using the same frequency band.

Figure 22:
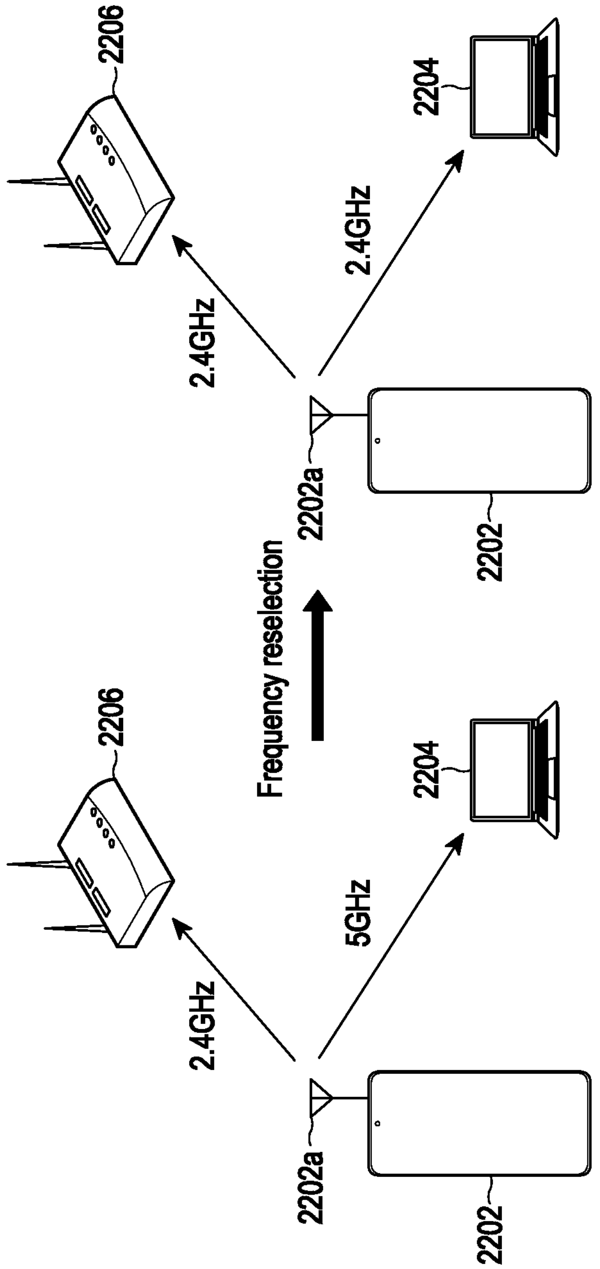
FIG. 22 illustrates frequency band selection operations in consideration of a WLAN connection according to an embodiment of the disclosure.

FIG. 22 illustrates frequency band selection in consideration of a WLAN connection according to an embodiment of the disclosure.

Referring to FIG. 22, an electronic device 2202 (e.g., the first electronic device 200) may be connected to an AP 2206 of a Wi-Fi network by using 2.4 GHz. In case that the electronic device 2202 having a single antenna 2202_a_ uses 5 GHz with an electronic device 2204 (e.g., the second electronic device 250) for a Wi-Fi direct-based P2P connection, simultaneous use of a 2.4 GHz WLAN connection and a 5 GHz P2P connection through a single antenna may not possible.

For the P2P connection with the electronic device 2204, the electronic device 2202 may select the same frequency band of 2.4 GHz as that used for the WLAN connection with the AP 2206. The electronic device 2202 may use the single antenna 2202_a_ to maintain the WLAN connection and the P2P connection on the same frequency band (e.g., 2.4 GHz).

In embodiments of the disclosure, the electronic device 2202 (e.g., the first electronic device 200) may select a frequency band for the P2P connection based on the Wi-Fi connection state of nearby electronic devices (e.g., the electronic device 2204 or the second electronic device 250) and a supported antenna configuration (e.g., whether it is a dual antenna or a single antenna) thereof. By selecting a frequency band for GO operation in simultaneous operation mode based on the antenna configuration and connection state, the electronic device 2202 can improve connection stability and data transfer rates.

Figure 23:
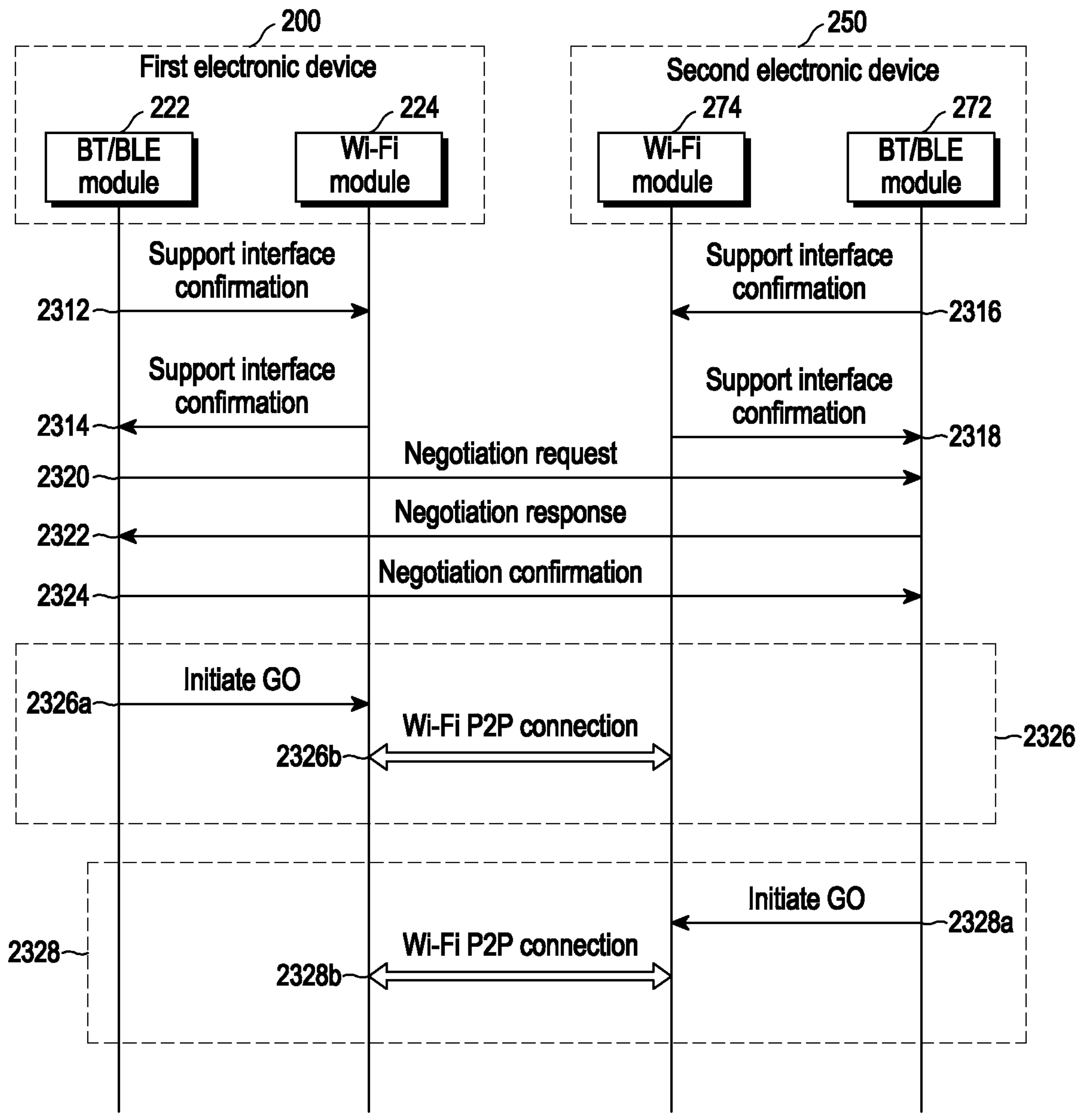
FIG. 23 illustrates group owner selection operations based on platform according to an embodiment of the disclosure.

FIG. 23 is a sequence diagram illustrating platform-based group owner selection according to an embodiment of the disclosure. According to embodiments, at least one of the operations described below may be omitted, modified, or executed in a different order.

Referring to FIG. 23, in operation 2312, the first electronic device 200 (e.g., the BT/BLE module 222) may request support interface confirmation from the Wi-Fi module 224 prior to broadcasting a negotiation request message including capability information for a Wi-Fi direct connection (e.g., P2P connection). In operation 2314, the first electronic device 200 (e.g., the BT/BLE module 222) may receive, from the Wi-Fi module 224, support interface information indicating whether frequency selection for group owner operation is supported.

In operation 2316, the second electronic device 250 (e.g., the BT/BLE module 272) may request support interface confirmation from the Wi-Fi module 274 prior to monitoring (e.g., BT/BLE scanning) the reception of a negotiation request message including capability information for a Wi-Fi direct connection (e.g., P2P connection). In operation 2318, the second electronic device 250 (e.g., the BT/BLE module 272) may receive, from the Wi-Fi module 274, support interface information indicating whether frequency selection for group owner operation is supported.

In operation 2320, the first electronic device 200 (e.g., the BT/BLE module 222) may broadcast a negotiation request message (e.g., a negotiation request message 2012) for group owner negotiation. In an embodiment, the negotiation request message may include capability information (e.g., first capability information 2012*b*) associated with Wi-Fi direct communication of the first electronic device 200. In an embodiment, the first capability information 2012*b* may include at least one of platform information 2022*a*, network information 2022*b*, or application context 2022*c*. The platform information 2022*a* may include information (e.g., OS type field of FIG. 20D) indicating whether the first electronic device 200 operates by a platform (e.g., OS) that supports frequency selection to initiate group owner operation, based on the support interface information determined through operation 2314. In an embodiment, in case that the support interface information indicates supporting frequency selection for group owner operation, the platform information 2022*a* may indicate supporting frequency selection for group owner operation.

In operation 2322, the second electronic device 250 (e.g., the BT/BLE module 272) may broadcast a negotiation response message (e.g., a negotiation response message 2014) in response to the negotiation request message. In an embodiment, the negotiation response message may include capability information (e.g., second capability information 2014*b*) associated with Wi-Fi direct communication of the second electronic device 250. In an embodiment, the second capability information 2014*b* may include at least one of platform information 2024*a*, network information 2024*b*, or application context 2024*c*. The platform information may include information (e.g., OS type field in FIG. 20D) indicating whether the second electronic device 250 operates by a platform (e.g., OS) that supports frequency selection to initiate group owner operation, based on the support interface information determined through operation 2318. In an embodiment, in case that the support interface information indicates supporting frequency selection for group owner operation, the platform information 2024*a* may indicate supporting frequency selection for group owner operation.

In operation 2324, the first electronic device (e.g., the BT/BLE module 222) may transmit a negotiation confirmation message (e.g., a negotiation confirmation message 2016) indicating receipt of the negotiation response message to the second electronic device 250.

In case that the first electronic device 200 is selected as a group owner based on the frequency selection capabilities of the first electronic device 200 and the second electronic device 250, operation 2326 may be executed. On the other hand, in case that the second electronic device 250 is selected as a group owner based on the frequency selection capabilities of the first electronic device 200 and the second electronic device 250, operation 2328 may be executed.

The first electronic device 200 may confirm the frequency selection capabilities of the first electronic device 200 and the second electronic device 250 through the capability sharing (e.g., OS type field) of operation 2320 and operation 2322. When the platform information 2022*a* included in the first capability information 2012*b* of operation 2320 indicates that the first electronic device 200 operates according to a platform that supports frequency selection, the first electronic device 200 may have priority in group owner selection. When the platform information 2024*a* included in the second capability information 2014*b* of operation 2322 indicates that the second electronic device 250 operates according to a platform that does not support frequency selection, the first electronic device 200 may select the first electronic device 200 itself as the group owner and execute operation 2326.

Operation 2326 may include operation 2326*a* and operation 2326*b*. In operation 2326*a*, the first electronic device 200 may instruct the Wi-Fi module 224 to initiate the group owner operation. In operation 2326*b*, the first electronic device 200 (e.g., the Wi-Fi module 224) may establish a Wi-Fi P2P connection with the second electronic device 250. In an embodiment, the first electronic device 200 (e.g., the Wi-Fi module 224) may broadcast a beacon signal according to the group owner operation, and may establish a P2P connection with the second electronic device 250 that is discovered due to the reception of the beacon signal.

When the platform information 2022*a* included in the first capability information 2012*b* of operation 2320 indicates that the first electronic device 200 operates according to a platform that does not support frequency selection, and the platform information 2024*a* included in the second capability information 2014*b* of operation 2322 indicates that the second electronic device 250 operates according to a platform that supports frequency selection, first electronic device 200 may select the second electronic device 250 as a group owner and execute operation 2328.

Operation 2328 may include operation 2328*a* and operation 2328*b*. In operation 2328*a*, the second electronic device 250 may instruct the Wi-Fi module 274 to initiate the group owner operation. In operation 2328*b*, the second electronic device 250 (e.g., the Wi-Fi module 274) may establish a Wi-Fi P2P connection with the first electronic device 200. In an embodiment, the second electronic device 250 (e.g., the Wi-Fi module 274) may broadcast a beacon signal according to the group owner operation, and may establish a P2P connection with the first electronic device 200 that is discovered due to the reception of the beacon signal.

Figure 24:
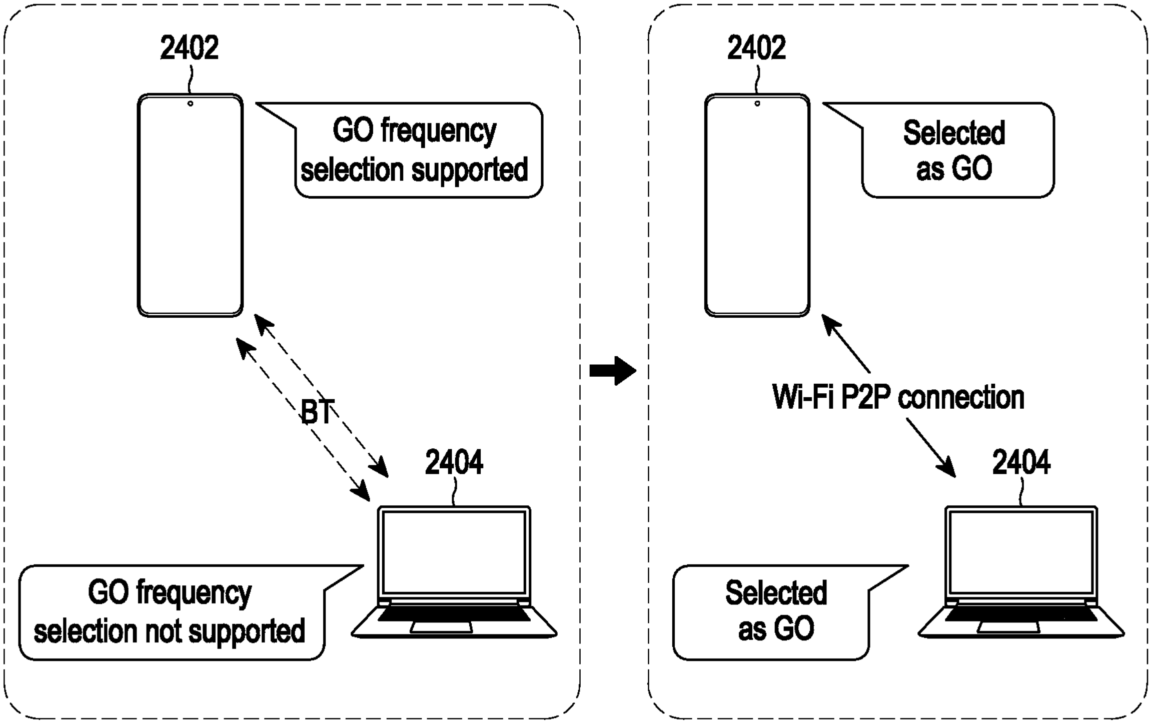
FIG. 24 illustrates group owner selection operations based on frequency selection capability according to an embodiment of the disclosure.

FIG. 24 illustrates group owner selection based on frequency selection capability according to an embodiment of the disclosure.

Referring to FIG. 24, an electronic device 2402 (e.g., the first electronic device 200) that desires to transfer a file by using a file sharing application may exchange capability information (e.g., first capability information and second capability information) with an electronic device 2404 (e.g., the second electronic device 250) through a BT/BLE channel. The electronic device 2402 may include information 2402*a* (e.g., an OS type field configured as "2" or "3"), which indicates that the first electronic device 2402 supports group owner frequency selection, in the first capability information included in the negotiation request message transmitted to the electronic device 2404. The electronic device 2404 may include information 2404*a* (e.g., an OS type field configured as "1") indicating that the second electronic device 2404 does not support group owner frequency selection, in the second capability information included in the negotiation response message transmitted to the electronic device 2402.

The electronic device 2402 may select the electronic device itself as a group owner based on the first capability information and the second capability information. The electronic device 2402 may support a 2.4 GHz frequency band to establish a P2P connection, whereas the electronic device 2404 may support both 2.4 GHz and 5 GHz. The electronic device 2402 may select a frequency band of 2.4 GHz by operating as the group owner, and may establish a Wi-Fi Direct-based P2P connection with the electronic device 2404 through the 2.4 GHz frequency band.

Figure 25:
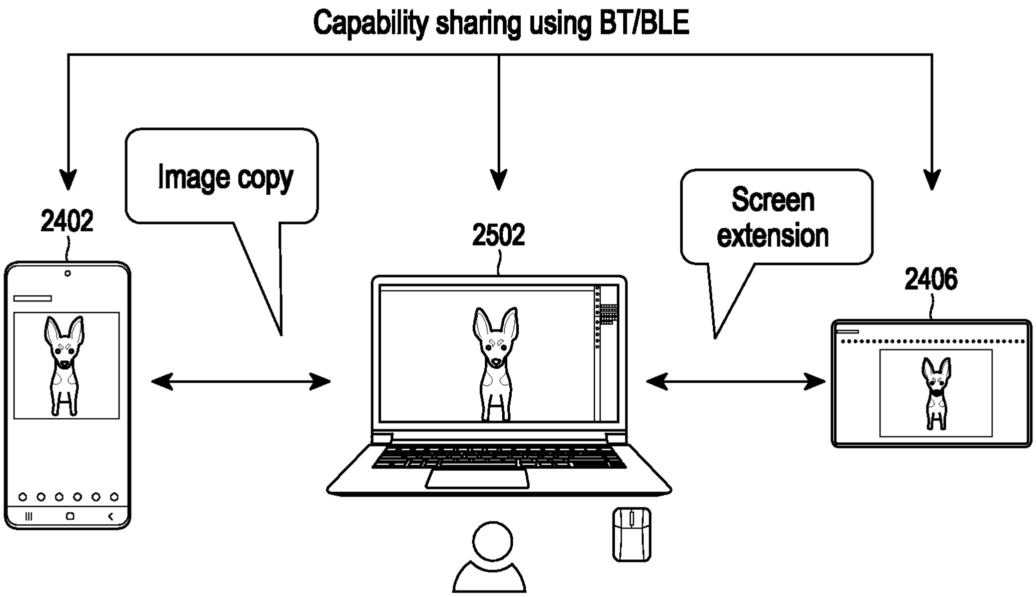
FIG. 25 illustrates multi-control service operations according to an embodiment of the disclosure.

FIG. 25 illustrates a multi-control service according to an embodiment of the disclosure.

Referring to FIG. 25, an electronic device 2502 (e.g., a laptop computer) (e.g., the first electronic device 200) may receive a copy of some images from an electronic device 2504 (e.g., a mobile phone) by using a multi-control service through a Wi-Fi direct connection (e.g., P2P connection) while editing a document based on a user operation. During document editing, the electronic device 2502 may extend at least a portion of a display screen of the electronic device 2502 to the electronic device 2506 (e.g., a tablet PC) by a multi-control service through a Wi-Fi direct connection so as to facilitate editing operations of the user.

The electronic device 2504 and the electronic device 2506 may be connected to the electronic device 2502 in a P2P group by using a Wi-Fi direct connection (e.g., P2P connection). The electronic device 2502 may be selected as a group owner of the P2P group based on capability information (e.g., at least one of network information, platform information, or application context) of the electronic device 2504 or the electronic device 2506 obtained through a BT/BLE channel, and may establish a Wi-Fi direct connection (e.g., P2P connection) in a frequency band selected for usable by both the electronic device 2504 and the electronic device 2506.

Figure 26:
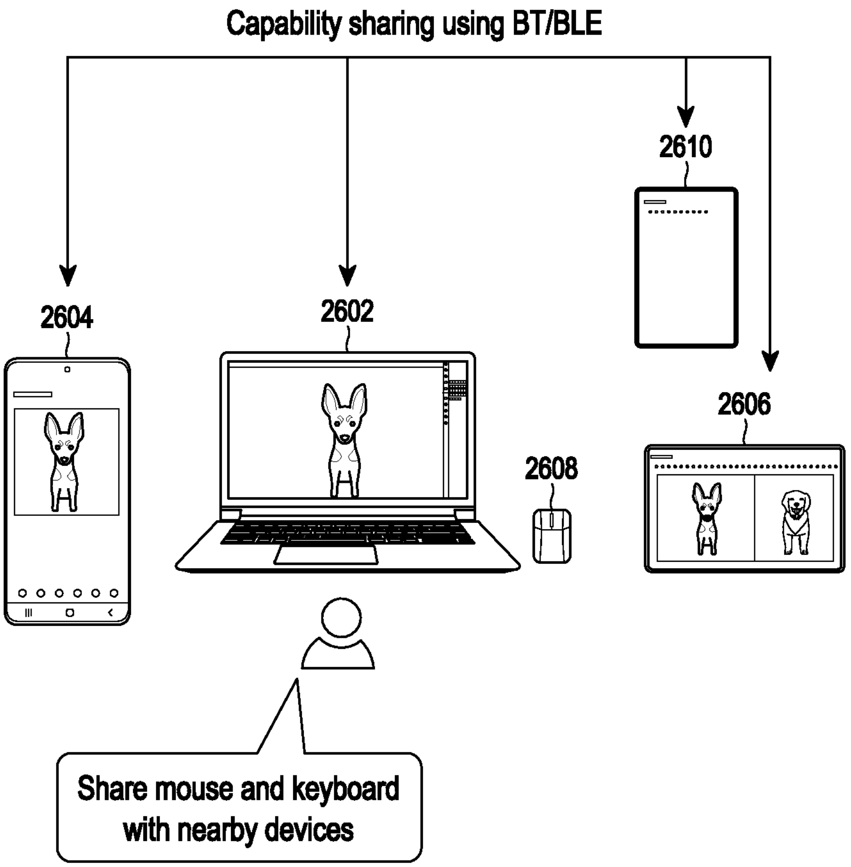
FIG. 26 illustrates sharing operations of nearby devices according to an embodiment of the disclosure.

FIG. 26 illustrates sharing operations of nearby devices according to an embodiment of the disclosure.

Referring to FIG. 26, an electronic device 2602 (e.g., a laptop computer) (e.g., the first electronic device 200) may share control of a nearby device 2608 (e.g., mouse and/or keyboard) with nearby electronic devices (e.g., an electronic device 2604, an electronic device 2606, and/or an electronic device 2610) by a multi-control service through a Wi-Fi direct connection (e.g., P2P connection) while editing a document in response to user operation.

The electronic device 2602 may execute an application (e.g., a multi-control application) that utilizes the Wi-Fi direct connection to allow a user to share use of the electronic device 2608 with the electronic device 2604, the electronic device 2606, and/or the electronic device 2610. The electronic device 2602 may quickly share capability information with the electronic device 2604, the electronic device 2606, and/or the electronic device 2610 through a BT/BLE channel by using low power, and may establish the Wi-Fi direct connection based on the shared capability information.

Figure 27:
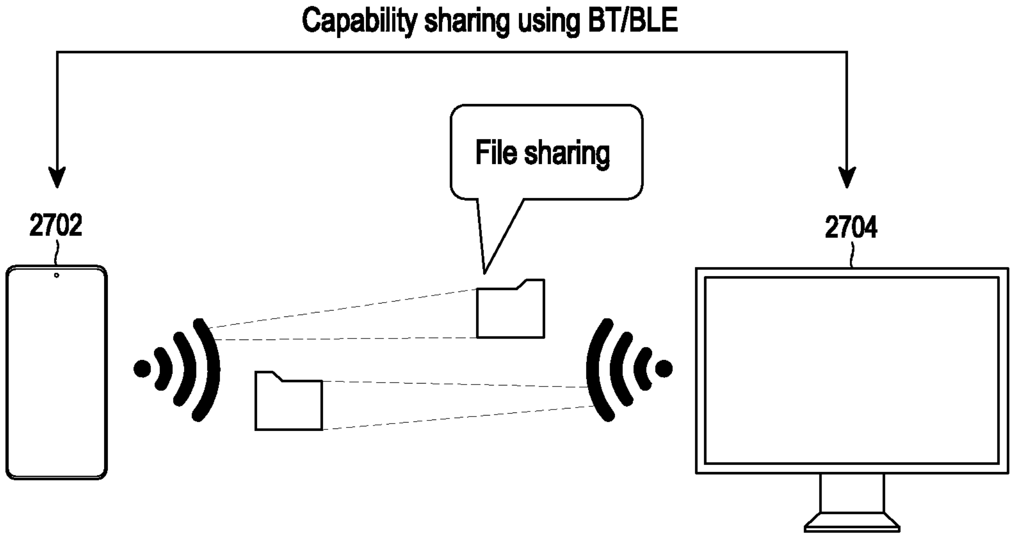
FIG. 27 illustrates file sharing operations according to an embodiment of the disclosure.

FIG. 27 illustrates file sharing operations according to an embodiment of the disclosure.

Referring to FIG. 27, an electronic device 2702 (e.g., the first electronic device 200) may execute a file sharing application to share files with an electronic device 2704 (e.g., the second electronic device 250). Based on capability information (e.g., OS type information) shared with electronic device 2704 through the BT/BLE channel, the electronic device 2702 may identify that electronic device 2704 does not support frequency selection capability, and may select the electronic device 2702 itself as a group owner. The electronic device 2702 may establish a Wi-Fi direct connection (e.g., P2P connection) through a frequency band selected to be supportable by both the electronic device 2702 and the electronic device 2704, and may transmit or receive files to or from the electronic device 2704 via the P2P connection.

Figure 28:
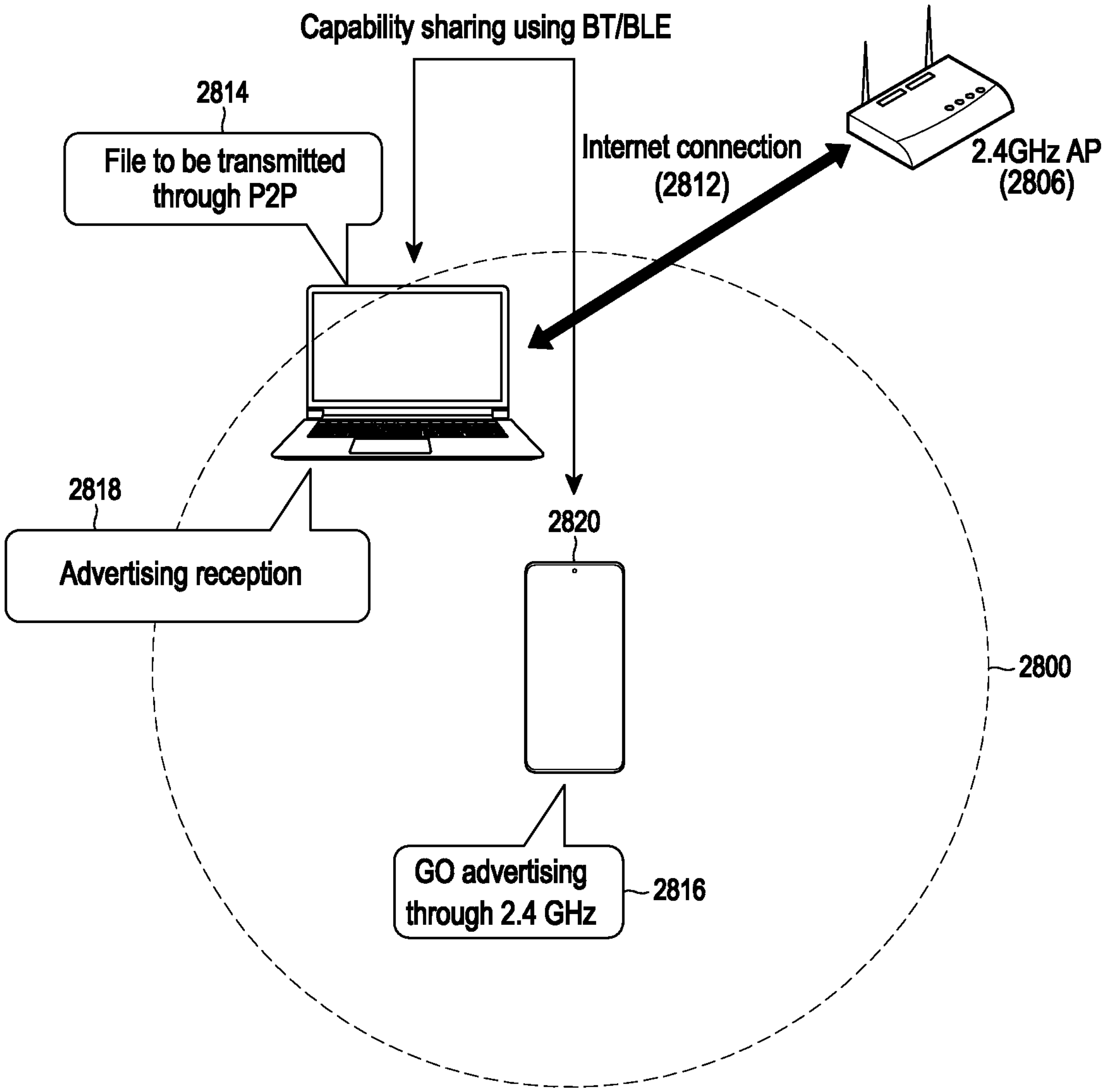
FIG. 28 illustrates frequency band selection operations based on supported bands according to an embodiment of the disclosure.

FIG. 28 illustrates frequency band selection operations based on supported bands according to an embodiment of the disclosure.

Referring to FIG. 28, in operation 2812, an electronic device 2804 may establish a WLAN connection of 2.5 GHz frequency band with an AP 2806, and may use a video streaming service through the WLAN connection. In operation 2814, the electronic device 2804 may execute a file sharing application to transmit files to an electronic device 2802 based on Wi-Fi Direct while the WLAN connection is maintained. The electronic device 2802 may share capability information with the electronic device 2804 through a BT/BLE channel, and may select the electronic device 2802 itself as a group owner and then select the 2.4 GHz frequency band that electronic device 2804 is using for the WLAN connection based on the capability information.

In operation 2816, the electronic device 2802 may broadcast a beacon for a Wi-Fi direct connection through the 2.4 GHz frequency band. In operation 2818, the electronic device 2804 may receive the beacon for the Wi-Fi direct connection while maintaining the WLAN connection and form a P2P group 2800 with the electronic device 2802 based on the beacon.

An electronic device 200 according to an embodiment of the disclosure may include memory 230 storing instructions, a communication circuit 220 including a Bluetooth communication module 222 and a Wi-Fi module 224, and a processor 210 operatively connected with the memory and the communication circuit. The instructions may be configured to, when the executed by the processor, cause the electronic device to broadcast, through the Bluetooth communication module, first capability information of the electronic device associated with a Wi-Fi direct connection. The instructions may be configured to, when the executed by the processor, cause the electronic device to, after broadcasting the first capability information, receive second capability information of an external electronic device 250 associated with the Wi-Fi direct connection through the Bluetooth communication module. The instructions may be configured to, when the executed by the processor, cause the electronic device to select a group owner (GO) and a frequency band for the Wi-Fi direct connection based on the first capability information and the second capability information. The instructions may be configured to, when the executed by the processor, cause the electronic device to transmit group owner information indicating the selected group owner and frequency band to the external electronic device through the Bluetooth communication module. The instructions may be configured to, when the executed by the processor, cause the electronic device to establish a Wi-Fi direct-based peer-to-peer (P2P) connection with the external electronic device through the Wi-Fi module, by using the selected frequency band.

In an embodiment, at least one of the first capability information or the second capability information may include network information. The network information may include at least one of information of an available band for the Wi-Fi direct connection, information of a current P2P role, or information of a connected AP.

In an embodiment, at least one of the first capability information or the second capability information may include platform information. The platform information may include at least one of an operating system (OS) type field, a device type field, a Wi-Fi driver manufacturer field, a Wi-Fi driver version field, or a Wi-Fi antenna count field.

In an embodiment, at least one of the first capability information or the second capability information may include application context information. The application context information may include at least one of a device ID field, a connection type field, a packet information field, or an identification information field.

In an embodiment, the group owner information may include at least one of a MAC address for identifying an electronic device selected as a group owner, or information indicating a frequency band to be used by the group owner.

In an embodiment, the instructions may be configured to, when the executed by the processor, cause the electronic device to receive one or more pieces of third capability information from one or more external electronic devices including the external electronic device through the Bluetooth communication module, and select the group owner and the frequency band based on the first capability information and the one or more pieces of third capability information.

In an embodiment, the instructions may be configured to, when the executed by the processor, cause the electronic device to select the frequency band that is supportable by all of the one or more external electronic devices including the external electronic device.

In an embodiment, the instructions may be configured to, when the executed by the processor, cause the electronic device to select the frequency band for the Wi-Fi direct connection, based on a number of antennas of the external electronic device and/or a frequency band that the external electronic device is using for a wireless local area network (WLAN) connection.

In an embodiment, the instructions may be configured to, when the executed by the processor, cause the electronic device to, in case that the external electronic device uses a single antenna and the external electronic device has a WLAN connection, select, as the frequency band for the Wi-Fi direct connection, the frequency band that the external electronic device is using for the WLAN connection.

In an embodiment, the instructions may be configured to, when the executed by the processor, cause the electronic device to select, as the group owner, an electronic device that supports a frequency selection function for the Wi-Fi direct connection among the electronic device and the external electronic device.

According to an embodiment of the disclosure, there may be provided a non-transitory computer-readable storage medium storing one or more programs, the one or more programs including instructions configured to, when executed by a processor 210 of an electronic device 200, cause the electronic device to broadcast, through the Bluetooth communication module, first capability information of the electronic device associated with a Wi-Fi direct connection, receive, through the Bluetooth communication module, second capability information of an external electronic device 250 associated with the Wi-Fi direct connection after broadcasting the first capability information, select a group owner and a frequency band for the Wi-Fi direct connection based on the first capability information and the second capability information, transmit group owner information indicating the selected group owner and the selected frequency band to the external electronic device through the Bluetooth communication module, and establish a peer-to-peer (P2P) connection with the external electronic device by using the selected frequency band.

In an embodiment, at least one of the first capability information or the second capability information may include network information. The network information may include at least one of information of an available band for the Wi-Fi direct connection, information of a current P2P role, or information of a connected AP.

In an embodiment, at least one of the first capability information or the second capability information may include platform information. The platform information may include at least one of an operating system (OS) type field, a device type field, a Wi-Fi driver manufacturer field, a Wi-Fi driver version field, or a Wi-Fi antenna count field.

In an embodiment, at least one of the first capability information or the second capability information may include application context information. The application context information may include at least one of a device ID field, a connection type field, a packet information field, or an identification information field.

In an embodiment, the group owner information may include at least one of a MAC address for identifying an electronic device selected as a group owner, or information indicating a frequency band to be used by the group owner.

In an embodiment, the one or more programs may include instructions configured to cause the electronic device to receive one or more pieces of third capability information from one or more external electronic devices including the external electronic device through the Bluetooth communication module, and select the group owner and the frequency band based on the first capability information and the one or more pieces of third capability information.

In an embodiment, the one or more programs may include instructions configured to cause the electronic device to select the frequency band that is supportable by all of the one or more external electronic devices including the external electronic device.

In an embodiment, the one or more programs may include instructions configured to cause the electronic device to select the frequency band for the Wi-Fi direct connection, based on a number of antennas of the external electronic device and/or a frequency band that the external electronic device is using for a wireless local area network (WLAN) connection.

In an embodiment, the one or more programs may include instructions configured to cause the electronic device to, in case that the external electronic device uses a single antenna and the external electronic device has a WLAN connection, select, as the frequency band for the Wi-Fi direct connection, the frequency band that the external electronic device is using for the WLAN connection.

In an embodiment, the one or more programs may include instructions configured to cause the electronic device to select, as the group owner, an electronic device that supports a frequency selection function for the Wi-Fi direct connection among the electronic device and the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to." "connected with." or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

A embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

memory storing instructions;

communication circuitry comprising a Bluetooth communication circuit and a Wi-Fi circuit; and a processor operatively connected with the memory and the communication circuitry, wherein the instructions are configured to, when executed by the processor, cause the electronic device to:

broadcast, through the Bluetooth communication circuit, a Bluetooth advertising packet comprising first capability information of the electronic device associated with a Wi-Fi direct connection;

receive, through the Bluetooth communication circuit, second capability information of an external electronic device associated with the Wi-Fi direct connection, wherein the external electronic device is included in a plurality of external electronic devices that receive the broadcasted Bluetooth advertising packet;

select both of a group owner and a frequency band for the Wi-Fi direct connection, based on the first capability information and the second capability information;

transmit group owner information indicating the selected group owner and the selected frequency band to the external electronic device through the Bluetooth communication circuit; and establish a peer-to-peer (P2P) connection with the external electronic device through the Wi-Fi circuit by using the selected frequency band.

2. The electronic device of claim 1, wherein at least one of the first capability information or the second capability information comprises network information, and wherein the network information comprises at least one of information of an available band for the Wi-Fi direct connection, information of a current P2P role, or information of a connected access point (AP).

3. The electronic device of claim 1, wherein at least one of the first capability information or the second capability information comprises platform information, and wherein the platform information comprises at least one of an operating system type field, a device type field, a Wi-Fi driver manufacturer field, a Wi-Fi driver version field, or a Wi-Fi antenna count field.

4. The electronic device of claim 1, wherein at least one of the first capability information or the second capability information comprises application context information, and wherein the application context information comprises at least one of a device ID field, a connection type field, a packet information field, or an identification information field.

5. The electronic device of claim 1, wherein the group owner information comprises at least one of a media access control address for identifying an electronic device selected as a group owner, or information indicating a frequency band to be used by the group owner.

6. The electronic device of claim 1, wherein the instructions are further configured to, when executed by the processor, cause the electronic device to:

receive, through the Bluetooth communication circuit, one or more pieces of third capability information from one or more external electronic devices including the external electronic device; and select the group owner and the frequency band based on the first capability information and the one or more pieces of third capability information.

7. The electronic device of claim 6, wherein the instructions are further configured to, when executed by the processor, cause the electronic device to select the frequency band that is supportable by all of the one or more external electronic devices including the external electronic device.

8. The electronic device of claim 1, wherein the instructions are further configured to, when executed by the processor, cause the electronic device to select the frequency band for the Wi-Fi direct connection, based on at least one of a number of antennas of the external electronic device or a frequency band that the external electronic device uses for a wireless local area network (WLAN) connection.

9. The electronic device of claim 1, wherein the instructions are further configured to, when executed by the processor, cause the electronic device to, based on identifying that the external electronic device uses a single antenna and the external electronic device has established a wireless local area network (WLAN) connection, select, as the frequency band for the Wi-Fi direct connection, the frequency band that the external electronic device uses for the WLAN connection.

10. The electronic device of claim 1, wherein the instructions are further configured to, when executed by the processor, cause the electronic device to select, as the group owner, one of the electronic device and the external electronic device, that supports a frequency selection function for the Wi-Fi direct connection.

11. A non-transitory computer-readable storage medium storing one or more programs, the one or more programs comprising instructions configured to, when executed by a processor of an electronic device, cause the electronic device to:

broadcast, through a Bluetooth communication circuit, a Bluetooth advertising packet comprising first capability information of the electronic device associated with a Wi-Fi direct connection;

receive, through the Bluetooth communication circuit, second capability information of an external electronic device associated with the Wi-Fi direct connection, wherein the external electronic device is included in a plurality of external electronic devices that receive the broadcasted Bluetooth advertising packet;

select both of a group owner and a frequency band for the Wi-Fi direct connection, based on the first capability information and the second capability information;

transmit group owner information indicating the selected group owner and the selected frequency band to the external electronic device through the Bluetooth communication circuit; and establish a peer-to-peer (P2P) connection with the external electronic device by using the selected frequency band.

12. The non-transitory computer-readable storage medium of claim 11, wherein at least one of the first capability information or the second capability information comprises network information, and wherein the network information comprises at least one of information of an available band for the Wi-Fi direct connection, information of a current P2P role, or information of a connected AP.

13. The non-transitory computer-readable storage medium of claim 11, wherein at least one of the first capability information or the second capability information comprises platform information, and wherein the platform information comprises at least one of an operating system type field, a device type field, a Wi-Fi driver manufacturer field, a Wi-Fi driver version field, or a Wi-Fi antenna count field.

14. The non-transitory computer-readable storage medium of claim 11, wherein at least one of the first capability information or the second capability information comprises application context information, and wherein the application context information comprises at least one of a device ID field, a connection type field, a packet information field, or an identification information field.

15. The non-transitory computer-readable storage medium of claim 11, wherein the group owner information comprises at least one of a media access control address for identifying an electronic device selected as a group owner, or information indicating a frequency band to be used by the group owner.

16. The non-transitory computer-readable storage medium of claim 11, wherein the one or more programs comprise instructions configured to cause the electronic device to:

receive, through the Bluetooth communication circuit, one or more pieces of third capability information from one or more external electronic devices including the external electronic device; and select the group owner and the frequency band based on the first capability information and the one or more pieces of third capability information.

17. The non-transitory computer-readable storage medium of claim 16, wherein the one or more programs comprise instructions configured to cause the electronic device to select the frequency band that is supportable by all of the one or more external electronic devices including the external electronic device.

18. The non-transitory computer-readable storage medium of claim 11, wherein the one or more programs comprise instructions configured to cause the electronic device to select the frequency band for the Wi-Fi direct connection, based on at least one of a number of antennas of the external electronic device or a frequency band that the external electronic device uses for a wireless local area network (WLAN) connection.

19. The non-transitory computer-readable storage medium of claim 11, wherein the one or more programs comprise instructions configured to cause the electronic device to, based on identifying that the external electronic device uses a single antenna and the external electronic device is configured to have a wireless local area network (WLAN) connection, select, as the frequency band for the Wi-Fi direct connection, the frequency band that the external electronic device uses for the WLAN connection.

20. The non-transitory computer-readable storage medium of claim 11, wherein the one or more programs comprise instructions configured to cause the electronic device to select, as the group owner, one of the electronic device and the external electronic device, that supports a frequency selection function for the Wi-Fi direct connection.

* * * * *